(12) United States Patent
Lee et al.

(10) Patent No.: US 11,184,138 B2
(45) Date of Patent: *Nov. 23, 2021

(54) METHOD FOR REPORTING CHANNEL STATUS INFORMATION IN WIRELESS COMMUNICATION SYSTEM SUPPORTING CHANGE IN USE OF WIRELESS RESOURCES, AND DEVICE THEREFOR

(71) Applicant: LG Electronics Inc., Seoul (KR)

(72) Inventors: Seungmin Lee, Seoul (KR); Hanbyul Seo, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,644

(22) Filed: Mar. 18, 2020

(65) Prior Publication Data

US 2020/0220697 A1  Jul. 9, 2020

Related U.S. Application Data

(63) Continuation of application No. 16/002,657, filed on Jun. 7, 2018, now Pat. No. 10,615,942, which is a
(Continued)

(51) Int. Cl.
*H04W 4/00* (2018.01)
*H04L 5/00* (2006.01)
(Continued)

(52) U.S. Cl.
CPC .......... *H04L 5/0057* (2013.01); *H04L 5/0048* (2013.01); *H04L 5/1469* (2013.01);
(Continued)

(58) Field of Classification Search
None
See application file for complete search history.

(56) References Cited

U.S. PATENT DOCUMENTS 9,826,528 B2    11/2017  Wei et al.
2011/0269490 A1  11/2011  Earnshaw et al.
(Continued)

FOREIGN PATENT DOCUMENTS

CN    102237958    11/2011
CN    102271031    12/2011
(Continued)

OTHER PUBLICATIONS

3rd Generation Partnership Project; Technical Specification Group Radio Access Network; "Evolved Universal Terrestrial Radio Access (E-UTRA); Physical layer procedures (Release 11)," 3GPP TS 36.213 V11.5.0, dated Dec. 15, 2013, 182 pages, XP050729031.
(Continued)

*Primary Examiner* — Elisabeth Benoit Magloire
(74) *Attorney, Agent, or Firm* — Fish & Richardson P.C.

(57) ABSTRACT

A method of reporting channel state information (CSI) by a user equipment (UE) in a wireless communication system includes receiving a configuration for CSI (channel state information)-resource containing at least one CSI resource set, wherein each of the at least one CSI resource set consist of CSI-RS (channel state information-reference signal) resources comprising at least one of NZP (non zero power) CSI-RS resource and CSI-IM (channel state information-interference measurement) resource, and measuring CSI resources within one of the at least one CSI resource set, according to the configuration for CSI resource.

20 Claims, 15 Drawing Sheets

Related U.S. Application Data continuation of application No. 15/116,118, filed as application No. PCT/KR2015/001692 on Feb. 23, 2015, now Pat. No. 10,003,448.

(60) Provisional application No. 61/945,820, filed on Feb. 27, 2014, provisional application No. 61/941,454, filed on Feb. 18, 2014.

(51) Int. Cl.
*H04L 5/14* (2006.01)
*H04W 24/08* (2009.01)
*H04W 72/04* (2009.01)

(52) U.S. Cl.
CPC ....... *H04W 24/08* (2013.01); *H04W 72/0446* (2013.01); *H04L 5/001* (2013.01)

(56) References Cited

U.S. PATENT DOCUMENTS

| | | | |
|---|---|---|---|
| 2012/0113852 | A1 | 5/2012 | Xu et al. |
| 2013/0044651 | A1* | 2/2013 | Wang ............... H04W 72/0406 370/280 |
| 2013/0242902 | A1 | 9/2013 | Liu et al. |
| 2013/0286904 | A1 | 10/2013 | Xu et al. |
| 2013/0301448 | A1 | 11/2013 | Sayana et al. |
| 2013/0336214 | A1 | 12/2013 | Sayana et al. |
| 2014/0010126 | A1 | 1/2014 | Sayana et al. |
| 2014/0036796 | A1 | 2/2014 | Etemad et al. |
| 2014/0086084 | A1 | 3/2014 | Bi et al. |
| 2014/0133333 | A1* | 5/2014 | Liu ..................... H04W 24/10 370/252 |
| 2014/0198751 | A1 | 7/2014 | Prasad et al. |
| 2014/0219202 | A1 | 8/2014 | Kim et al. |
| 2014/0321407 | A1 | 10/2014 | Seo et al. |
| 2014/0334391 | A1 | 11/2014 | Khoshnevis et al. |
| 2015/0055584 | A1 | 2/2015 | Lee et al. |
| 2015/0188690 | A1* | 7/2015 | Khoryaev ......... H04W 36/0066 370/280 |
| 2015/0200752 | A1* | 7/2015 | Yin ..................... H04L 5/1469 370/280 |
| 2015/0207601 | A1 | 7/2015 | Kim et al. |
| 2015/0282036 | A1 | 10/2015 | Yi et al. |
| 2015/0304995 | A1 | 10/2015 | Yi et al. |
| 2015/0327324 | A1 | 11/2015 | Wei et al. |
| 2015/0341091 | A1 | 11/2015 | Park et al. |
| 2015/0341927 | A1 | 11/2015 | Wei et al. |
| 2015/0358094 | A1 | 12/2015 | Yi et al. |
| 2015/0358137 | A1* | 12/2015 | Chae ..................... H04L 1/1854 370/329 |
| 2015/0358142 | A1 | 12/2015 | Lee et al. |
| 2015/0358962 | A1 | 12/2015 | Lee et al. |
| 2015/0382222 | A1 | 12/2015 | Park et al. |
| 2015/0382371 | A1 | 12/2015 | Liu et al. |
| 2016/0021551 | A1 | 1/2016 | Park et al. |
| 2016/0044663 | A1 | 2/2016 | Yao et al. |
| 2016/0105817 | A1 | 4/2016 | Frenne et al. |
| 2016/0119101 | A1 | 4/2016 | Liu et al. |
| 2016/0157248 | A1* | 6/2016 | Lin .................... H04W 72/0406 370/329 |
| 2018/0091285 | A1 | 3/2018 | Hosseini et al. |

FOREIGN PATENT DOCUMENTS

| | | |
|---|---|---|
| EP | 2667681 | 11/2013 |
| JP | 2014009853 | 1/2014 |
| KR | 1020140009982 | 1/2014 |
| WO | WO2013055147 | 4/2013 |
| WO | WO2013165160 | 11/2013 |

OTHER PUBLICATIONS

European Office Action in European Application No. 15752449.7, dated Oct. 7, 2019, 5 pages.
LG Electronics, "Remaining Details of UL/DL Reconfiguration Signaling in TDD eIMTA," 3GPP TSG RAN WG1 Meeting #76, R1-140298, Prague, Czech Republic, Feb. 10-14, 2014, pp. 1-4.
NTT Docomo, "Some Viewpoints about Reconfiguration Signaling Design", 3GPP TSG RAN WG1 Meeting #75, R1-135507, San Francisco, USA, Nov. 11-15, 2013, pp. 1-3 (5 pages total).
Qualcomm Incorporated, "Remaining details of CSI measurement and reporting in eIMTA", 3GPP TSG RAN WG1 Meeting #76, R1-140438, Prague, Czech Republic, Feb. 10-14, 2014 (downloaded by EPO on Feb. 9, 2014), pp. 1-3 (4 pages total).
Texas Instruments, "Views on CSI measurement for LTE TDD eIMTA", 3GPP TSG-RAN WG1 #76, R1-140530, Prague, Czech Republic, Feb. 10-14, 2014 (downloaded by EPO on Feb. 9, 2014), 5 pages.
Zte, "Remaining Details of Signalling for TDD UL-DL Reconfiguration", 3GPP TSG RAN WG1 Meeting #75, R1-135365, San Francisco, USA, Nov. 11-15, 2013, pp. 1-5.
3rd Generation Partnership Project; Technical Specification Group Radio Access Network, "Evolved Universal Terrestrial Radio Access (E-UTRA); Physical layer procedures (Release 12)," 3GPP TS 36.213, V12.0.0, dated Dec. 2013, 186 pages.
Samsung, "Remaining issues on CSI feedback for eIMTA," R1-140347, 3GPP TSG RAN WG1 #76, Prague, Czech Republic, dated Feb. 10-14, 2014, 4 pages.

* cited by examiner

FIG. 2
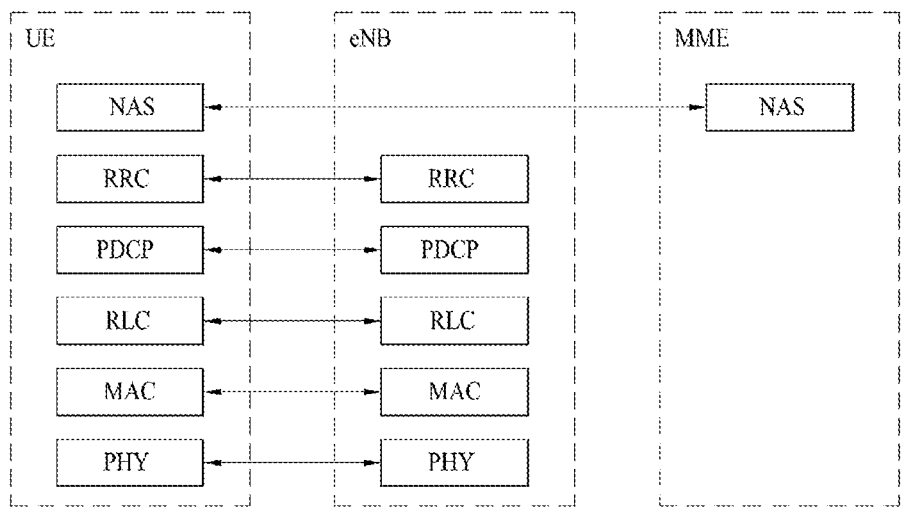
(a) Control-plane protocol stack
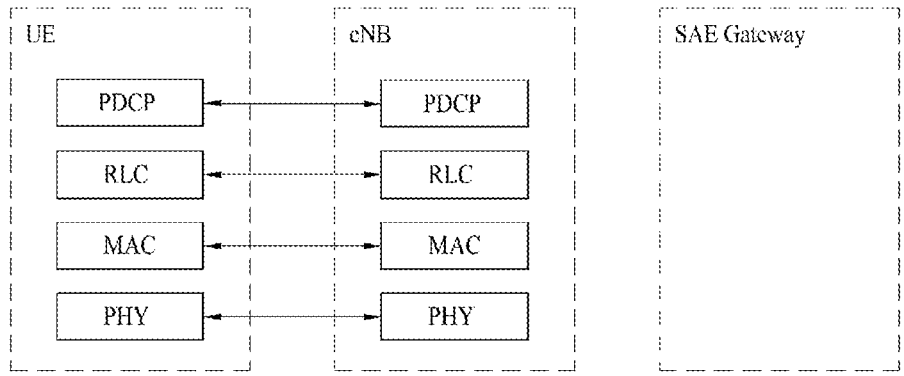
(b) User-plane protocol stack

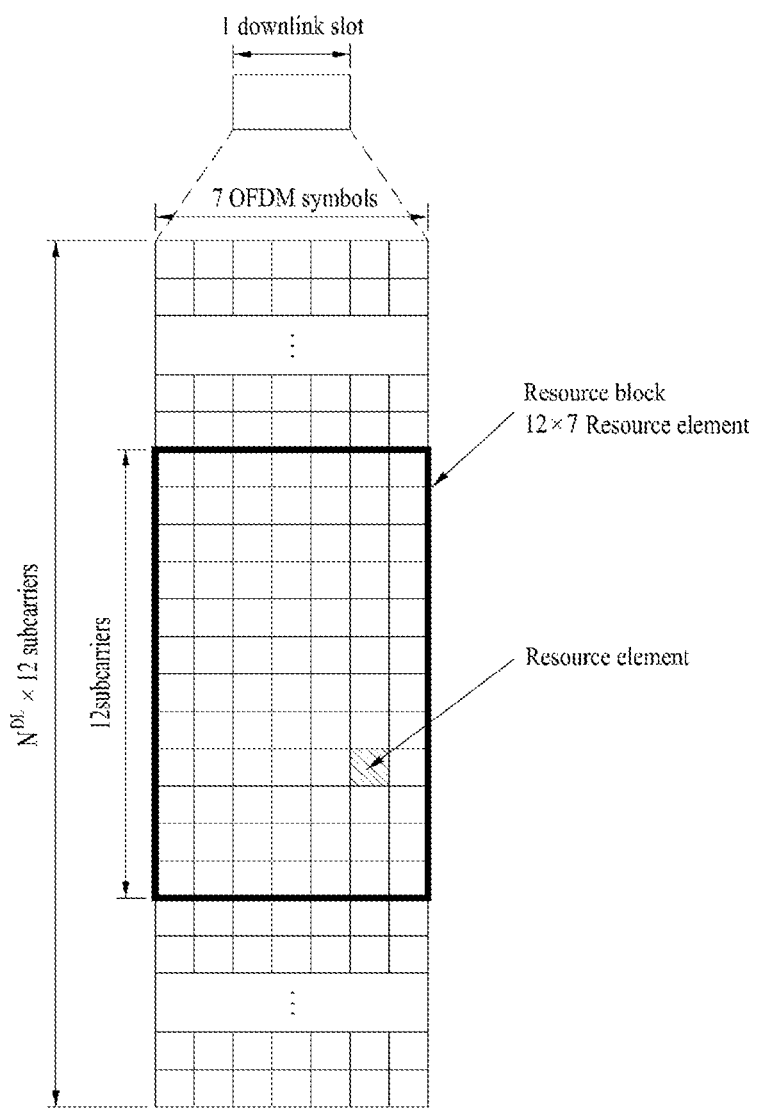

METHOD FOR REPORTING CHANNEL STATUS INFORMATION IN WIRELESS COMMUNICATION SYSTEM SUPPORTING CHANGE IN USE OF WIRELESS RESOURCES, AND DEVICE THEREFOR

CROSS-REFERENCE TO RELATED APPLICATIONS

This application is a continuation of U.S. application Ser. No. 16/002,657, filed on Jun. 7, 2018, now allowed, which is a continuation of U.S. application Ser. No. 15/116,118, filed on Aug. 2, 2016, now U.S. Pat. No. 10,003,448, which is the National Phase of PCT International Application No. PCT/KR2015/001692, filed on Feb. 23, 2015, which claims the priority benefit under 35 U.S.C. § 119(e) to U.S. Provisional Application No. 61/945,820, filed on Feb. 27, 2014 and 61/941,454, filed on Feb. 18, 2014, all of which are hereby expressly incorporated by reference into the present application.

BACKGROUND OF THE INVENTION

Field of the Invention

The present invention relates to a wireless communication system and, more particularly, to a method of reporting channel state information in a wireless communication system supporting usage change of a radio resource and an apparatus therefor.

Discussion of the Related Art

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

SUMMARY OF THE INVENTION

An object of the present invention based on the above-described discussion is to provide a method of reporting channel state information in a wireless communication system supporting usage change of a radio resource and an apparatus therefor.

The technical objects that can be achieved through the present invention are not limited to what has been particularly described hereinabove and other technical objects not described herein will be more clearly understood by persons skilled in the art from the following detailed description.

In an aspect of the present invention for solving the above-described problem, provided herein is a method of reporting channel state information (CSI) by a user equipment (UE) in a wireless communication system supporting usage change of a radio resource, including receiving a reconfiguration message for dynamically changing usage of the radio resource, measuring the CSI in a CSI reference resource duration corresponding to the reconfiguration message, and reporting the CSI to a base station (BS), wherein the CSI reference resource duration includes a first CSI measurement resource set and a second CSI measurement resource set, the first CSI measurement resource set includes a plurality of first radio resources having fixed radio resource usage, and the second CSI measurement resource set includes a plurality of second radio resources having reconfigurable radio resource usage.

The CSI may be set to a predefined value to indicate a fallback mode when the second CSI measurement resource set is invalid. The CSI may be reported through a predefined uplink resource for the fallback mode.

When the second CSI measurement resource set is invalid, the CSI may be set to CSI reported prior to the CSI reference resource duration, both the first CSI measurement resource set and the second CSI measurement resource set being valid.

The CSI reference resource duration may be defined such that only radio resources after a subframe in which the reconfiguration message is transmitted are valid.

The CSI reference resource duration may be defined such that only radio resources present after a start subframe of a time window in which the reconfiguration message is transmitted are valid. The time window may be defined according to a period at which the reconfiguration message is identically transmitted.

The CSI reference resource duration may be defined such that only radio resources present prior to 4 ms from a subframe for reporting the CSI are valid.

Reporting of the CSI corresponds to aperiodic CSI reporting and the CSI reference resource duration may be defined such that only radio resources present prior to a timing at which a triggering message for reporting the CSI is received are valid.

In another aspect of the present invention for solving the above-described problem, provided herein is a user equipment (UE) for reporting channel state information (CSI) in a wireless communication system supporting usage change of a radio resource, including a radio frequency unit and a processor, wherein the processor is configured to receive a reconfiguration message for dynamically changing usage of the radio resource, measure the CSI in a CSI reference resource duration corresponding to the reconfiguration message, and report the CSI to a base station (BS), the CSI reference resource duration includes a first CSI measurement resource set and a second CSI measurement resource set, the first CSI measurement resource set includes a plurality of first radio resources having fixed radio resource usage, and the second CSI measurement resource set includes a plurality of second radio resources having reconfigurable radio resource usage.

According to embodiments of the present invention, channel state information reporting can be efficiently performed in a wireless communication system supporting usage change of a radio resource.

The effects that can be achieved through the present invention are not limited to what has been particularly described hereinabove and other advantages not described herein will be more clearly understood by persons skilled in the art from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 2 is a diagram illustrating structures of a control plane and a user plane of a radio interface protocol between a user equipment and E-UTRAN based on the 3GPP radio access network standard.

FIG. 5 illustrates a resource grid of a DL slot.

DETAILED DESCRIPTION

Figure 1:
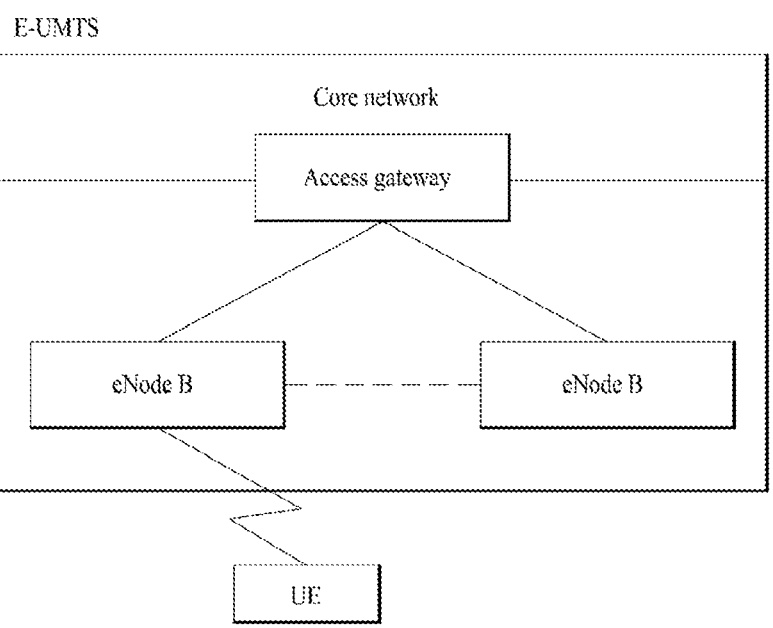
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
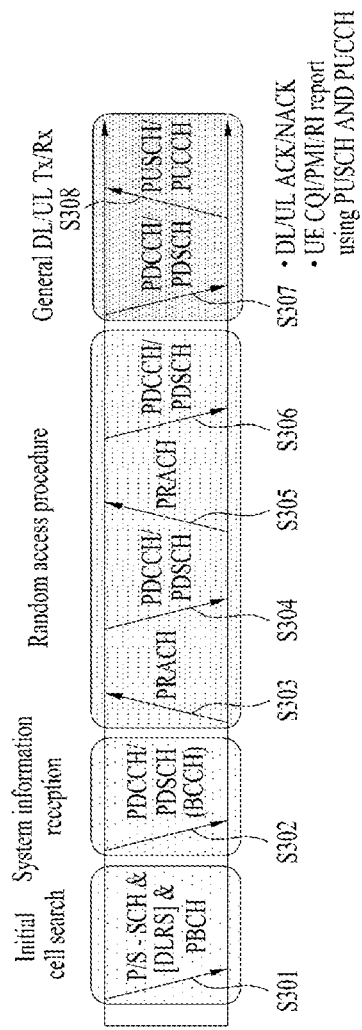
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4A:
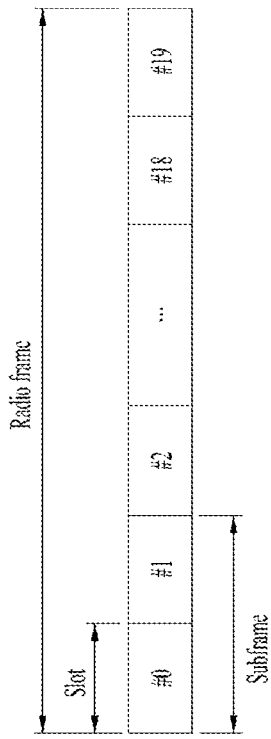
FIGS. 4A and 4B are diagrams illustrating a structure of a radio frame used in an LTE system.
Figure 4B:
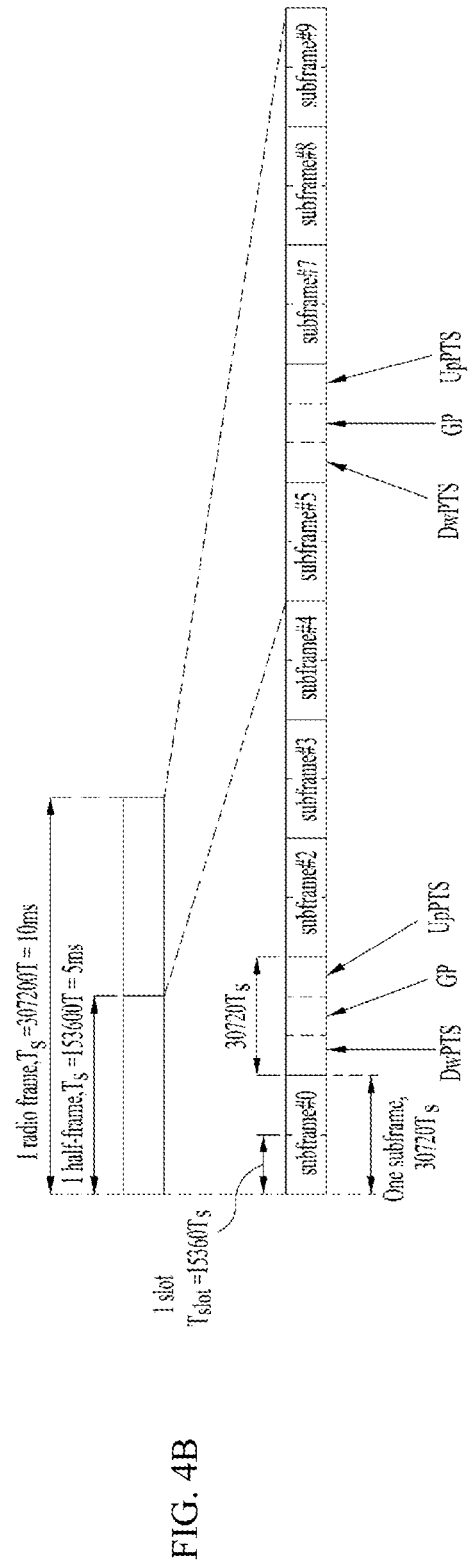

FIGS. 4A and 4B are diagrams illustrating a structure of a radio frame used in an LTE system.

Referring to FIGS. 4A and 4B, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4A is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols.

At this time, first maximum three OFDM symbols of each subframe may be allocated to a physical downlink control channel (PDCCH), and the other OFDM symbols may be allocated to a physical downlink shared channel (PDSCH).

FIG. 4B is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | 12800·$T_s$ | | |
| 8 | 24144·$T_s$ | | | — | — | — |
| 9 | 13168·$T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

FIG. 5 illustrates a resource grid of a DL slot.

Referring to FIG. 5, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times N_{sc}^{RB}$ subcarriers in the frequency domain. Although FIG. 5 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE is indicated by one OFDM symbol index and one subcarrier index. One RB includes $N_{symb}^{DL} \times N_{sc}^{RB}$ REs. The number of RBs, $N_{RB}^{DL}$, included in a DL slot depends on DL bandwidth configured in a cell.

Figure 6:
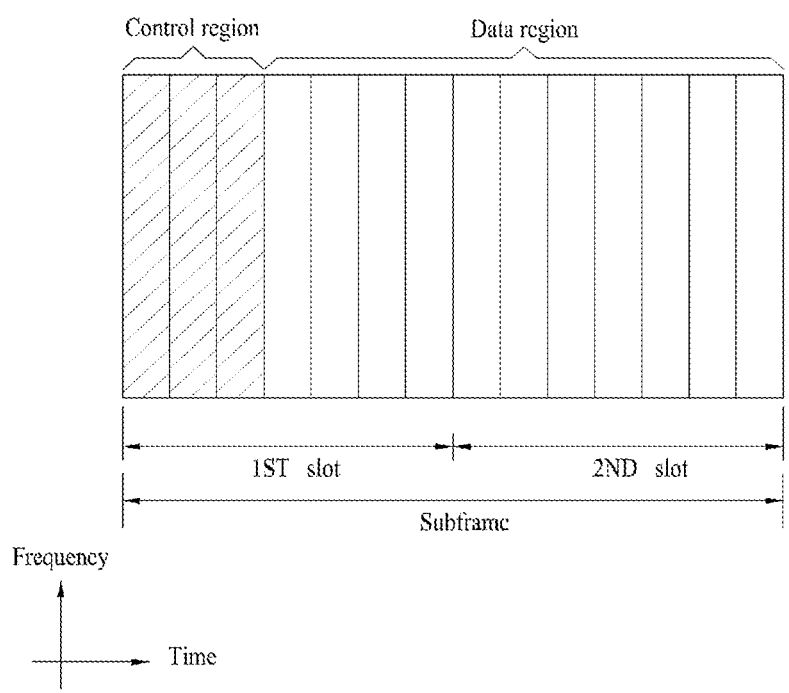
FIG. 6 illustrates the structure of a DL subframe.

FIG. 6 illustrates the structure of a DL subframe.

Referring to FIG. 6, up to three (or four) OFDM symbols at the start of the first slot of a DL subframe are used as a control region to which control channels are allocated and the other OFDM symbols of the DL subframe are used as a data region to which a PDSCH is allocated. DL control channels defined for an LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE corresponds to a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked with an identifier (ID) (e.g., a radio network temporary identifier (RNTI)) according to the owner or use of the PDCCH. If the PDCCH is destined for a specific UE, the CRC may be masked with a cell-RNTI (C-RNTI) of the UE. If the PDCCH carries a paging message, the CRC may be masked with a paging ID (P-RNTI). If the PDCCH carries system information (particularly, a system information block (SIB)), the CRC may be masked with a system information RNTI (SI-RNTI). If the PDCCH is designated as a random access response, the CRC may be masked with a random access-RNTI (RA-RNTI).

Figure 7:
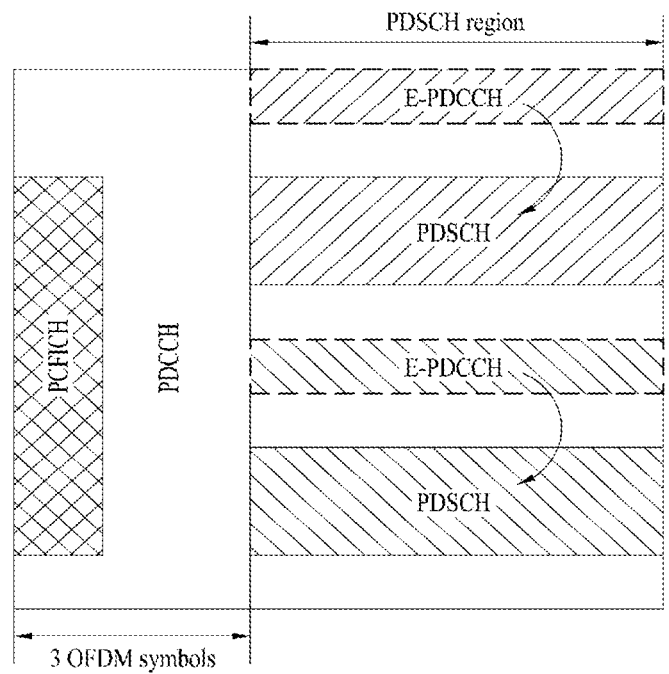
FIG. 7 is a diagram illustrating an EPDCCH and a PDSCH scheduled by the EPDCCH.

FIG. 7 is a diagram illustrating an EPDCCH and a PDSCH scheduled by the EPDCCH.

Referring to FIG. 7, the EPDCCH may use a PDSCH region by defining a part of the PDSCH region in which data is generally transmitted and a UE should perform a blind decoding operation to confirm whether an EPDCCH thereof is detected. The EPDCCH performs the same scheduling operation as a legacy PDCCH (i.e., PDSCH or PUSCH control). However, if the number of UEs connected to a node such as a remote radio head (RRH) increases, more EPDCCHs are allocated to the PDSCH region and the number of blind decoding operations that should be performed by the UE increases, thereby increasing complexity.

Hereinafter, a resource specific measurement scheme will be described.

As a method for reducing intercell interference, an intercell interference cancellation scheme in the time domain has been proposed in which an aggressor cell uses a silent subframe (hereinafter, referred to as an almost blank subframe (ABS)) in which transmission power of a portion of physical channels is reduced or the physical channels are not transmitted and a victim cell schedules the UE based on the silent subframe. Generally, a subframe designated as the ABS is configured to transmit only a CRS.

In this case, an interference level greatly varies depending on a subframe in terms of the UE of the victim cell. In order to perform, in each subframe, a more accurate radio link monitoring (RLM) operation, a radio resource management (RRM) operation of measuring reference signal received power (RSRP)/reference signal received quality (RSRQ), or CSI measurement, the RLM operation/RRM operation should be limitedly performed in a set of subframes having a uniform interference characteristic. Therefore, a current 3GPP LTE standard document defines a set of two CSI subframes for resource specific measurement.

Hereinafter, a transmission mode will be described.

The current 3GPP LTE standard document, specifically, 3GPP TS 36.213, defines DL transmission modes as shown in Tables 3 and 4 below. The following transmission modes may be configured for the UE through higher layer signaling, i.e., RRC signaling.

TABLE 3

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD (see clause 7.1.3) or Transmit diversity |
| Mode 4 | DCI format 1A | Common and UE specific by C-RNTI | Transmit diversity |
|  | DCI format 2 | UE specific by C-RNTI | Closed-loop spatial multiplexing(see clause 7.1.4)or Transmit diversity |
| Mode 5 | DCI format 1A | Common and UE specific by C-RNTI | Transmit diversity |
|  | DCI format 1D | UE specific by C-RNTI | Multi-user MIMO(see clause 7.1.5) |
| Mode 6 | DCI format 1A | Common and UE specific by C-RNTI | Transmit diversity |
|  | DCI format 1B | UE specific by C-RNTI | Closed-loop spatial multiplexing (see clause 7.1.4) using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 (see clause 7.1.5A) or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 (see clause 7.1.5B)or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2D | UE specific by C-RNTI | Up to 8 layer transmission, ports 7-14 (see clause 7.1.5B) or single-antenna port, port 7 or 8 |

TABLE 4

| Transmission mode | DCI format | Search Space | Transmission scheme of PDSCH corresponding to EPDCCH |
|---|---|---|---|
| Mode 1 | DCI format 1A | UE specific by C-RNTI | Single-antenna port, port 0 |
|  | DCI format 1 | UE specific by C-RNTI | Single-antenna port, port 0 |
| Mode 2 | DCI format 1A | UE specific by C-RNTI | Transmit diversity |
|  | DCI format 1 | UE specific by C-RNTI | Transmit diversity |
| Mode 3 | DCI format 1A | UE specific by C-RNTI | Transmit diversity |
|  | DCI format 2A | UE specific by C-RNTI | Large delay CDD (see clause 7.1.3) or Transmit diversity |

TABLE 4-continued

| Transmission mode | DCI format | Search Space | Transmission scheme of PDSCH corresponding to EPDCCH |
|---|---|---|---|
| Mode 4 | DCI format 1A | UE specific by C-RNTI | Transmit diversity |
|  | DCI format 2 | UE specific by C-RNTI | Closed-loop spatial multiplexing(see clause 7.1.4)or Transmit diversity |
| Mode 5 | DCI format 1A | UE specific by C-RNTI | Transmit diversity |
|  | DCI format 1D | UE specific by C-RNTI | Multi-user MIMO(see clause 7.1.5) |
| Mode 6 | DCI format 1A | UE specific by C-RNTI | Transmit diversity |
|  | DCI format 1B | UE specific by C-RNTI | Closed-loop spatial multiplexing (see clause 7.1.4) using a single transmission layer |
| Mode 7 | DCI format 1A | UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 (see clause 7.1.5A) or single-antenna port, port 7 or 8 |
| Mode 9 | DCI format 1A | UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2C | UE specific by C-RNTI | Up to 8 layer transmission, ports 7-14 (see clause 7.1.5B) or single-antenna port, port 7 or 8 |
| Mode 10 | DCI format 1A | UE specific by C-RNTI | Non-MBSFN subframe: If the number of PBCH antenna ports is one, Single-antenna port, port 0 is used, otherwise Transmit diversity MBSFN subframe: Single-antenna port, port 7 |
|  | DCI format 2D | UE specific by C-RNTI | Up to 8 layer transmission, ports 7-14 (see clause 7.1.5B) or single-antenna port, port 7 or 8 |

In the current 3GPP LTE standard document, a DCI format is defined according to the type of an RNTI masked to a PDCCH/EPDCCH. Particularly, in the case of a C-RNTI and an SPS C-RNTI, a transmission mode and a DCI format corresponding to the transmission mode, i.e., a transmission mode based DCI format are defined. In addition, DCI format 1A capable of being applied regardless of each transmission mode is also defined. Table 3 shows the case in which the type of the RNTI masked to the PDCCH is the C-RNTI and Table 4 shows the case in which the type of the RNTI masked to the EPDCCH is the C-RNTI. For the case in which the type of the RNTI masked to the PDCCH/EPCCH is the SPS C-RNTI, refer to the LTE/LTE-A standard document 36.213.

For example, in Table 3, if DCI format 1B is detected as a result of blind-decoding the PDCCH masked with the C-RNTI in a UE specific search space, a PDSCH is decoded on the assumption that the PDSCH is transmitted by a closed-loop spatial multiplexing scheme using a single layer.

Hereinafter, CSI will be described.

Multiple input multiple output (MIMO) can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver may perform beamforming based on CSI to obtain multiplexing gain of MIMO transmit antennas. The transmitter (e.g., an eNB or a relay as an access DL transmission entity) may allocate a UL control channel or a UL shared channel to the receiver (e.g., a UE or a relay as a backhaul DL reception entity) such that the receiver may feedback the CSI.

CSI fed back may include a rank indicator (RI), a precoding matrix index (PMI), and a channel quality indictor (CQI).

The RI indicates information about a channel rank. The channel rank represents a maximum number of layers (or streams) through which different pieces of information may be transmitted through the same time-frequency resource. The RI is mainly determined by long term fading of a channel and, thus, the RI may be fed back at a longer period relative to the PMI and CQI.

The PMI is information about a precoding matrix used for transmission from the transmitter and is a value in which spatial characteristics of a channel are reflected. Precoding refers to mapping of a transport layer to a transmit antenna. A layer-to-antenna mapping relation may be determined by a precoding matrix. The PMI indicates a precoding matrix index of an eNB preferred by a UE based on a metric such as signal-to-interference plus noise ratio (SINR). To reduce feedback overhead of precoding information, the transmitter and receiver may share a codebook including various precoding matrices and only an index indicating a specific precoding matrix in the codebook may be fed back.

The CQI is information indicating channel quality or channel strength. The CQI may be represented by an index corresponding to a combination of predetermined modulation and coding schemes (MCSs). That is, a feedback CQI index may indicate a modulation scheme and a code rate. Generally, the CQI is a value reflecting a reception SINR capable of being obtained when the eNB configures a spatial channel using the PMI.

In a system supporting an extended antenna configuration (e.g., LTE-A system), acquisition of additional multi-user diversity using multi-user MIMO (MU-MIMO) is considered. When an eNB performs DL transmission using CSI fed back by one of multiple UEs, it is necessary to prevent DL transmission from interfering with other UEs since an interference channel is present between UEs multiplexed in the antenna domain in MU-MIMO.

Accordingly, in order to correctly perform MU-MIMO operation, more accurate CSI feedback than single user MIMO (SU-MIMO) needs to be fed back.

A new CSI feedback scheme that improves CSI composed of the RI, PMI, and CQI may be applied in order to measure and report more accurate CSI. For example, precoding information fed back by the receiver may be indicated by a combination of two PMIs. One (first PMI) of the two PMIs has long term and/or wideband attributes and may be referred to as W1. The other PMI (second PMI) of the two PMIs has short term and/or subband attributes and may be referred to as W2. A final PMI may be determined by a combination (or function) of W1 and W2. For example, if the final PMI is W, W may be defined as W=W1*W2 or W=W2*W1.

Hereinafter, CQI calculation will be described.

CQI calculation will be described in detail on the assumption that a DL receiver is UE. A method of configuring/defining a resource which is a reference for calculating a CQI when the UE reports CSI (hereinafter, referred to as a reference resource) will be described. First, definition of the CQI will be described in detail.

The CQI reported by the UE corresponds to a specific index value. A CQI index is a value indicating a modulation scheme, a code rate, etc. corresponding to a channel state. For example, CQI indexes and interpretation thereof may be given as shown in Table 5.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an unrestricted observation interval in time and frequency, the UE may derive, for each CQI value reported in UL subframe n, the highest CQI index between CQI index 1 and CQI index 15 in Table 5 which satisfies a predetermined condition: A single PDSCH transport block with a combination of modulation scheme (e.g., MCS) and transport block size (TBS) corresponding to the CQI index, and occupying a group of DL physical resource blocks termed a CSI reference resource, could be received with a transport block error probability not exceeding 0.1 (i.e., 10%). If CQI index 1 does not satisfy the condition, UE may determine the CQI value as CQI index 0.

If CSI subframe sets $C_{CSI,0}$ and $C_{CSI,1}$ are configured by higher layers, each CSI reference resource belongs to either $C_{CSI,0}$ or $C_{CSI,1}$ but not to both. When SCI subframe sets $C_{CSI,0}$ and $C_{CSI,1}$ are configured by higher layers, the UE is not expected to receive a trigger for the CSI reference resource in a subframe that does not belong to either subframe set. For the UE in transmission mode 10 and periodic CSI reporting, the CSI subframe set for the CSI reference resource is configured by higher layers for each CSI process.

For the UE in transmission mode 9 when parameter pmi-RI-Report is configured by higher layers, the UE may derive channel measurements for computing the CQI value reported in UL subframe n based on only CSI-reference signals (CSI-RSs) for which the UE is configured to assume non-zero power. For the UE in transmission mode 9 when the parameter pmi-RI-Report is not configured by higher layers or in transmission modes 1 to 8, the UE may derive the channel measurements for computing CQI based on a CRS.

For the UE in transmission mode 10, the UE may derive the channel measurements for computing the CQI value reported in UL subframe n and corresponding to a CSI process, based on only the non-zero power CSI-RS within a configured CSI-RS resource associated with the CSI process.

For the UE in transmission mode 10, the UE may derive the interference measurements for computing the CQI value reported in UL subframe n and corresponding to a CSI process, based on only the zero power CSI-RS within the configured CSI-interference measurement (CSI-IM) resource associated with the CSI process. If the UE in transmission mode 10 is configured by higher layers for CSI subframe sets $C_{CSI,0}$ and $C_{CSI,1}$ for the CSI process, the configured CSI-IM resource within the subframe subset belonging to the CSI reference resource is used to derive the interference measurement.

A combination of modulation scheme and transport block size corresponds to a CQI index if all of the following conditions are satisfied, that is, if i) the combination could be signaled for transmission on the PDSCH in the CSI reference resource according to the relevant TBS table, ii) the modulation scheme is indicated by the CQI index, and iii) the combination of TBS and modulation scheme when applied to the reference resource results in an effective channel code rate which is as close as possible to the code rate indicated by the CQI index. If more than two combinations of TBS and modulation scheme results in an effective channel code rate equally close to the code rate indicated by the CQI index, only the combination with the smallest of such TBSs is relevant.

Meanwhile, a CQI reference resource is defined as follows.

In the frequency domain, the CSI reference resource is defined by the group of DL physical resource blocks corresponding to the band to which the derived CQI value relates.

In the time domain, for the UE configured in transmission modes 1 to 9 or transmission mode 10 with a single configured CSI process for the serving cell, the CQI reference resource is defined by a single DL subframe $n-n_{CQI\_ref}$. In this case, for periodic CQI reporting $n-n_{CQI\_ref}$ is the smallest value greater than or equal to 4, such that it corresponds to a valid DL subframe and, for aperiodic CQI reporting $n-n_{CQI\_ref}$ is the same DL subframe as the valid DL subframe corresponding to a CQI request (or in which the CQI request is received) in a UL DCI format (i.e., a PDCCH DCI format for providing UL scheduling control information to the UE). In addition, for aperiodic CQI reporting $n-n_{CQI\_ref}$ is equal to 4 and DL subframe $n-n_{CQI\_ref}$ corresponds to a valid DL subframe, in which DL subframe $n-n_{CQI\_ref}$ is received after the subframe with the corresponding CQI request (or in which the CQI request is received) in a random access response grant.

In the time domain, for a UE configured in transmission mode 10 with multiple configured CSI processes for the serving cell, the CQI reference resource is defined by a single DL subframe $n-n_{CQI\_ref}$.

In this case, for FDD and periodic or aperiodic CQI reporting, $n-n_{CQI\_ref}$ is the smallest value greater than or equal to 5, such that it corresponds to a valid DL subframe, and, for aperiodic CSI reporting, the corresponding CSI request is in a UL DCI format. For FDD and aperiodic CQI reporting, $n-n_{CQI\_ref}$ is equal to 5 and DL subframe $n-n_{CQI\_ref}$ corresponds to a valid DL subframe (or in which the CQI request is received), where DL subframe $n-n_{CQI\_ref}$ is received after the subframe with the corresponding CQI request in a random access response grant.

For TDD, and 2 or 3 configured CSI processes, and periodic or aperiodic CSI reporting, $n-n_{CQI\_ref}$ is the smallest value greater than or equal to 4, such that it corresponds to a valid DL subframe and, for aperiodic CSI reporting, the corresponding CSI request is in a UL DCI format. For TDD, and 2 or 3 configured CSI processes, and aperiodic CSI reporting, $n-n_{CQI\_ref}$ is equal to 4 and DL subframe $n-n_{CQI\_ref}$ corresponds to a valid DL subframe, where DL subframe $n-n_{CQI\_ref}$ is received after the subframe with the corresponding CQI request (or in which the CQI request is received) in a random access response grant.

For TDD, and 4 configured CSI processes, and periodic or aperiodic CSI reporting, $n_{CQI\_ref}$ is the smallest value greater than or equal to 5, such that it corresponds to a valid DL subframe and, for aperiodic CSI reporting, the corresponding CSI request is in a UL DCI format. For TDD, and 4 configured CSI processes, and aperiodic CSI reporting, $n_{CQI\_ref}$ is equal to 5 and DL subframe $n-n_{CQI\_ref}$ corresponds to a valid DL subframe, where DL subframe $n-n_{CQI\_ref}$ is received after a subframe with the corresponding CSI request in a random access response grant.

The valid DL subframe means a DL subframe corresponding to the case in which the DL subframe is configured for the corresponding UE, the DL frame is not a multicast broadcast single frequency network (MBSFN) subframe except for transmission mode 9 or 10, the DL subframe does not contain a DwPTS field when the length of DwPTS is 7680*Ts (Ts=1/(15000×2048) seconds) or less, and the DL subframe does not fall within a configured measurement gap for the UE. For periodic CSI reporting, the DL subframe is an element of the CSI subframe set linked with the periodic CSI report and, for a UE configured in transmission mode 10 with multiple configured CSI processes, aperiodic CSI reporting for a CSI process, the DL subframe is an element of the CSI subframe set linked with the periodic CSI report, and for a UE configured with a CSI subframe set for a CSI process, the DL subframe is an element of the CSI subframe set linked with the DL subframe with the CSI request in a UL DCI format.

If there is no valid DL subframe for the CQI reference resource, CQI reporting may be omitted in UL subframe n.

In the layer domain, the CQI reference resource is defined by any RI and PMI based on which the CQI is calculated.

In the CSI reference resource, the UE may assume the following for the purpose of deriving the CQI index: (1) The first 3 OFDM symbols of a DL subframe are used for control signaling; (2) No resource elements are used by primary or secondary synchronization signals or PBCH; (3) CP length of the non-MBSFN subframes; (4) Redundancy version is 0; (5) If CSI-RS is used for channel measurements, the ratio of PDSCH energy per resource element (EPRE) to CSI-RS EPRE is given as a predetermined value by higher layers; (6) A PDSCH transmission scheme (single antenna port transmission, transmission diversity, spatial multiplexing, MU-MIMO, etc.) defined for each transmission mode is currently configured for the UE (which may be a default mode); (7) If CRS is used for channel measurements, the ratio of PDSCH EPRE to cell-specific RS EPRE is determined according to a predetermined condition; and (8) The PDSCH transmission scheme is given by Table 6 depending on the transmission mode currently configured for the UE.

TABLE 6

| Transmission Mode | Transmission Scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity<br>If the UE is configured with PMI/RI reporting: closed-loop spatial multiplexing |
| 9 | If the UE is configured without PMI/RI reporting: if the number of PBCH antenna ports is one, single-antenna port, port 0; otherwise transmit diversity<br>If the UE is configured with PMI/RI reporting: if the number of CSI-RS ports is one, single-antenna port, port 7; otherwise up to 8 layer transmission, ports 7-14 (see subclause 7.1.5B [1]) |
| 10 | If a CSI process of the UE is configured without PMI/RI reporting: if the number of CSI-RS ports is one, single-antenna port, port7; otherwise transmit diversity<br>If a CSI process of the UE is configured with PMI/RI reporting: if the number of CSI-RS ports is one, single-antenna port, port 7; otherwise up to 8 layer transmission, ports 7-14 (see subclause 7.1.5B [1]) |

For details of CQI definition including CSI reporting in the case in which PMI/RI reporting is not configured, reference may be made to 3GPP TS36.213.

Based on the above description, the present invention proposes a method of stably supporting channel estimation and reporting operations of a UE regardless of whether the UE has successfully received a radio resource reconfiguration message, in the case in which a plurality of cells dynamically changes usage of a radio resource according to a system overhead state of the cells and informs the UE of information about change of usage of the radio resource through a reconfiguration message of a predefined format.

The reconfiguration message may be defined by a higher layer signaling format (e.g., SIB/PBCH/MAC/RRC) or a physical layer signaling format (e.g., PDCCH/EPDCCH/PDSCH) and may have a UE-specific, a cell-specific, UE-group-specific, or UE-group-common characteristic. Additionally, the reconfiguration message may be transmitted through a UE-specific search space (USS) or a common search space (CSS).

For convenience of description, embodiments of the present invention will be described based on a 3GPP LTE system. However, the range of a system to which the present invention is applied may be extended to other systems in addition to the 3GPP LTE system.

The embodiments of the present invention may be extended to the case of dynamically changing a resource on a specific cell or a specific component carrier (CC) according to a system overhead state in an environment to which carrier aggregation (CA) is applied. The embodiments of the present invention may also be extended to the case of dynamically changing usage of a radio resource in a TDD system, an FDD system, or a TDD/FDD combination system. For convenience of description of the embodiments, it will be assumed hereinbelow that each cell in a TDD system environment dynamically changing usage of a legacy radio resource according to a system overhead state of the cell.

Legacy radio resources may be classified into two types of resources due to dynamic change of usage of the radio resources.

For example, the legacy radio resources may be classified into a resource set used for static (i.e., fixed) usage and a resource set, usage of which is dynamically changed, (i.e., flexible resources). As an example, a resource set which is used (or which has been used) as the same usage as UL-DL configuration of an SIB may be defined as a static resource set and a resource set which is used (or which has a probability of being used) as different usage from UL-DL configuration of the SIB may be defined as a flexible resource set.

As another example, a resource set which is used (or which has been used) as the same usage as UL-DL configuration configured at a previous usage change timing (e.g., a usage change scheme based on a predefined reconfiguration period) may be defined as the static resource set and a resource set which is used (or which has a probability of being used) as different usage from UL-DL configuration configured at the previous usage change timing may be defined as the flexible resource set.

As still another example, a resource set which is used (or which has been used) as the same usage as UL-DL configuration of a predefined reference DL HARQ timeline (or UL-DL configuration of reference UL HARQ timeline) may be defined as the static resource set and a resource set which is used (or which has a probability of being used) as different usage from UL-DL configuration of the reference DL HARQ timeline (or UL-DL configuration of the reference UL HARQ timeline) may be defined as the flexible resource set.

In this case, the reference DL/UL HARQ timeline is a timeline configured for the purpose of stably maintaining a HARQ timeline regardless of (re)change of UL-DL configuration and may be defined as a DL/UL HARQ timeline of UL-DL configuration including at least one of i) a union of DL subframes/an intersection of UL subframes, ii) a unit of DL subframes/a union of UL subframes, iii) an intersection of DL subframes/an intersection of UL subframes, and iv) an intersection of DL subframes/a union of UL subframes of reconfigurable UL-DL configuration candidates.

Figure 8:
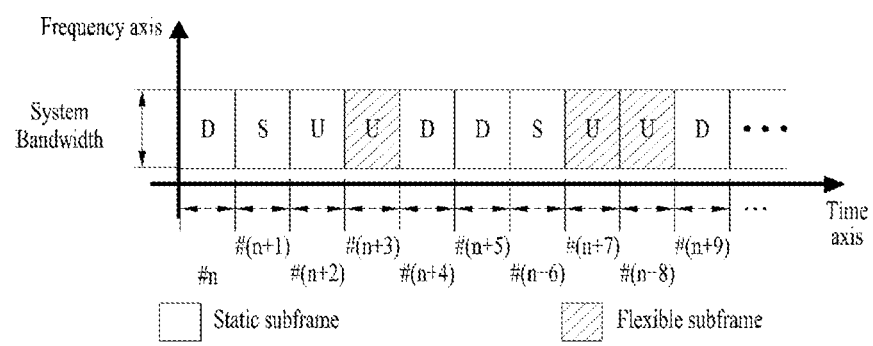
FIG. 8 illustrates the case in which legacy subframes are classified into a static subframe set and a flexible subframe set in a TDD system environment.
Figure 9A:
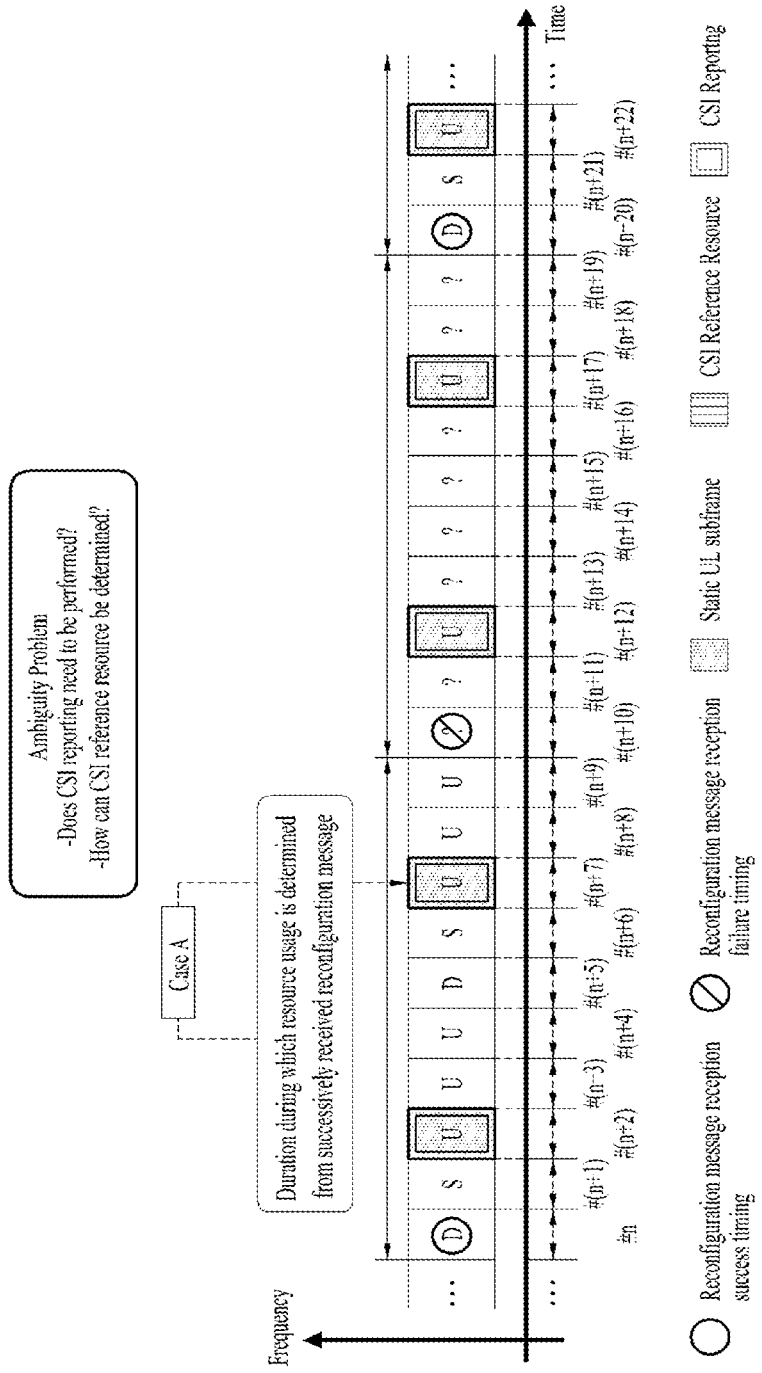
FIGS. 9A to 9D are diagrams referred to in explaining ambiguity of CSI reporting and location determination of a CSI reference resource due to failure of reception of a reconfiguration message by a UE in a legacy wireless communication system.
Figure 9B:
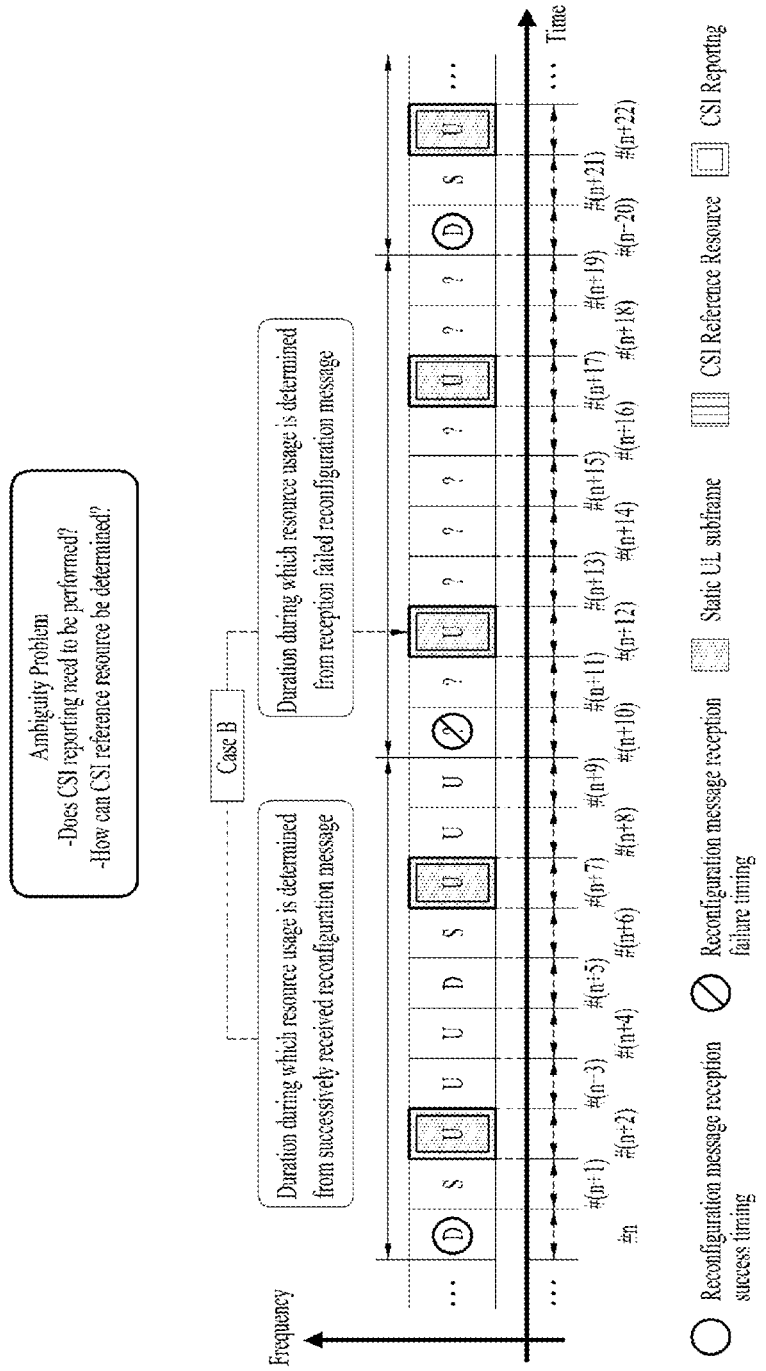
Figure 9C:
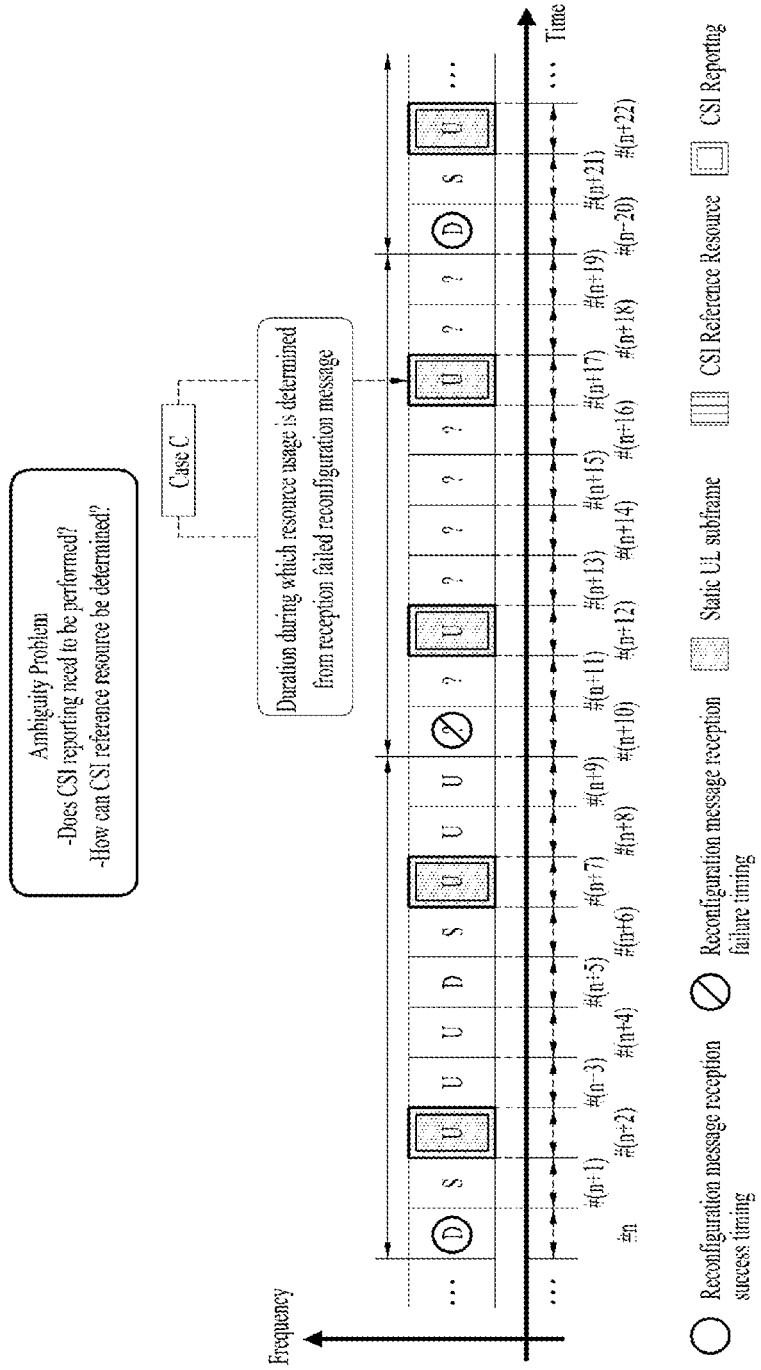
Figure 9D:
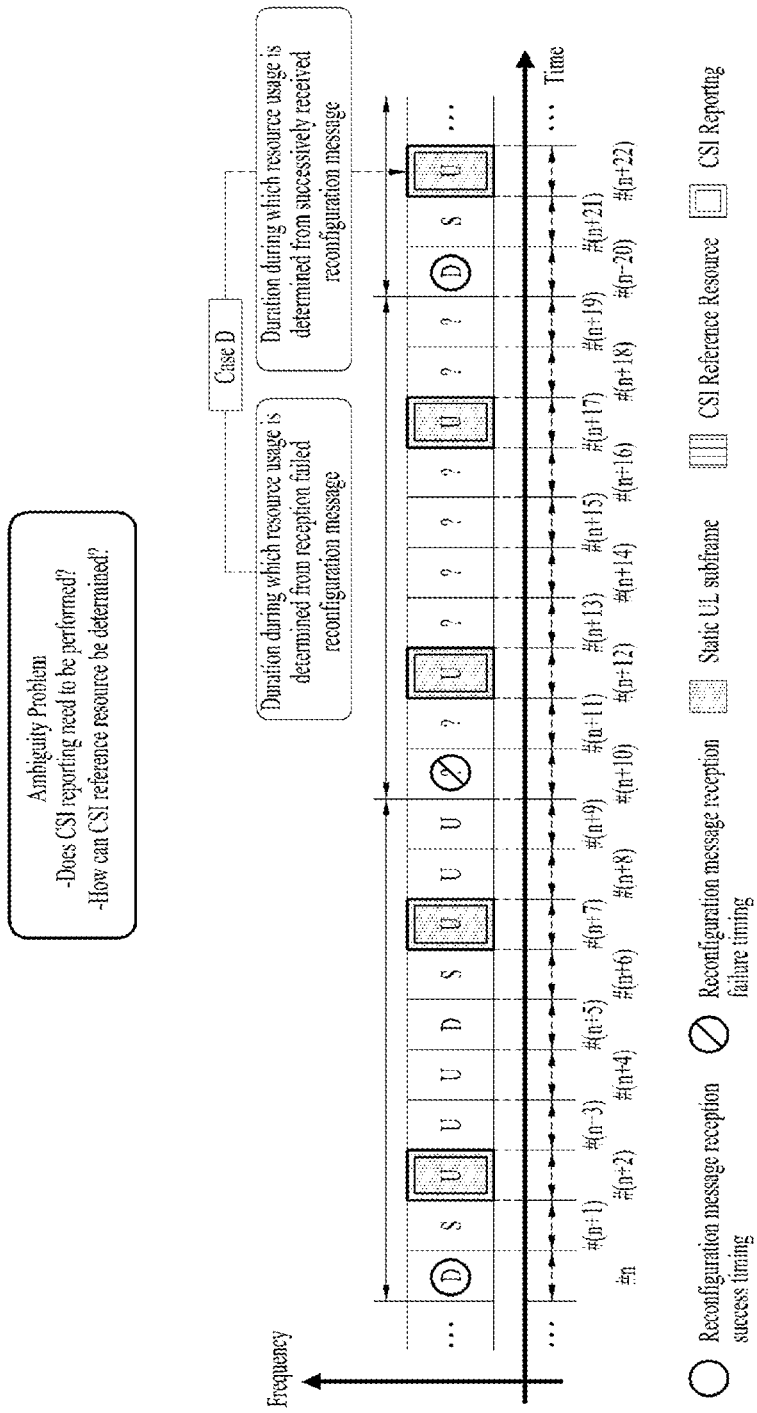

FIG. 8 illustrates the case in which legacy subframes are classified into a static subframe set and a flexible subframe set in a TDD system environment. In FIG. 8, it is assumed that a legacy UL-DL configuration configured through an SIB signal is UL-DL configuration #1 (i.e., DSUUDD-SUUD) and an eNB informs a UE of reconfiguration information of usage of a radio resource through a predefined signal.

The radio resource reconfiguration message is used, according to a predefined rule, to indicate usage of radio resources appearing i) after a timing including a reconfiguration message reception timing, ii) after a timing excluding the reconfiguration message reception timing, or iii) at a timing a predefined time after the reconfiguration message reception timing (i.e., after a subframe offset).

Therefore, in order to perform stable DL/UL communication of a system and derive and report stable CSI by a UE, a method of transmitting/receiving the reconfiguration message with a high success probability or UL-DL configuration (i.e., a fallback operation for UL-DL configuration) assumed by a specific UE in the case in which the UE has not successfully received the reconfiguration message needs to be defined. The case in which the UE has not successfully received the reconfiguration message may include, for example, the case in which a result of cyclic redundancy check (CRC) for the received reconfiguration message is determined to be false or the case in which the UE misses the reconfiguration message (e.g., the case in which the UE misses the reconfiguration message due to a discontinuous reception (DRX) operation).

FIGS. 9A to 9D illustrate the case in which an ambiguity problem as to which assumption/rule about UL-DL configuration is based on to determine the location of a valid CSI reference resource linked with CSI reporting of a specific timing occurs due to reception failure of a reconfiguration message by a UE.

In FIGS. 9A to 9D, it is assumed that a periodic CSI reporting operation is configured (e.g., a period of 5 ms) and corresponding periodic CSI reporting is performed through a static UL resource. It is also assumed that a legacy UL-DL configuration configured through an SIB signal is UL-DL configuration #0 (i.e., DSUUUDSUUU) and an eNB transmits the reconfiguration message based on a predefined period (e.g., 10 ms) and a predefined signal format. It is assumed that the UE has not successfully received the reconfiguration message transmitted in subframe #(n+10) and thus the UE cannot clearly recognize usage of subframes starting from subframe #(n+10), usage of which is determined by the reconfiguration message, to subframe #(n+19).

For the cases of FIG. 9A to 9D, a CSI reporting timing and the location of a valid CSI reference resource linked with CSI reporting will now be described.

Case A: A description is given with reference to FIG. 9A.
 CSI reporting timing: belongs to a duration during which resource usage is determined from a successfully received reconfiguration message.
 The location of a valid CSI reference resource linked with CSI reporting: belongs to a duration during which resource usage is determined from a successfully received reconfiguration message.
Case B: A description is given with reference to FIG. 9B.
 CSI reporting timing: belongs to a duration during which resource usage is determined from a reception failed reconfiguration message.
 The location of a valid CSI reference resource linked with CSI reporting: belongs to a duration during which resource usage is determined from a successfully received reconfiguration message.
Case C: A description is given with reference to FIG. 9C.
 CSI reporting timing: belongs to a duration during which resource usage is determined from a reception failed reconfiguration message.

The location of a valid CSI reference resource linked with CSI reporting: belongs to a duration during which resource usage is determined from a reception failed reconfiguration message.

Case D: A description is given with reference to FIG. 9D.

CSI reporting timing: belongs to a duration during which resource usage is determined from a successfully received reconfiguration message.

The location of a valid CSI reference resource linked with CSI reporting: belongs to a duration during which resource usage is determined from a reception failed reconfiguration message.

CSI Reporting Configuration of UE Independent of Whether Reconfiguration Message has been Received In the above-described cases of FIGS. 9A to 9D (i.e., Case A, Case B, Case C, and Case D), at least one of rules for i) configuration for determining the location of a valid CSI reference resource linked with CSI reporting of a specific timing, ii) configuration for a condition that should be satisfied to be considered as the valid CSI reference resource, and iii) an assumption about UL-DL configuration used to determine the location of the valid CSI reference resource needs to be (re)defined regardless of whether the reconfiguration message has been successfully received in order to derive and report stable CSI by a UE. That is, due to reception failure of the reconfiguration message by the UE, in the above-described cases of FIGS. 9A to 9D (i.e., Case A, Case B, Case C, and Case D), an ambiguity problem as to whether CSI reporting should be (actually) performed, an ambiguity problem as to how the location of the valid CSI reference resource linked with CSI reporting of a specific timing should be determined, and/or an ambiguity problem as to which assumption about UL-DL configuration should be made to determine the location of the valid CSI reference resource may occur.

Further, in the above-described cases of FIGS. 9A to 9D (i.e., Case A, Case B, Case C, and Case D), the location of the valid CSI reference resource linked with CSI reporting of a specific timing may be regarded as one of i) the nearest subframe which corresponds to a previous timing including a predetermined value (e.g., 4 ms or 5 ms) starting from the CSI reporting timing and simultaneously satisfies a condition of a predefined valid CSI reference resource, ii) a subframe which corresponds to a timing prior to the predefined value starting from the CSI reporting timing and simultaneously satisfies the condition of the predefined valid CSI reference resource (e.g., aperiodic CSI reporting based on a CSI request filed of a random access response (RAR) grant), and iii) a subframe in which a CSI request field of a UL DCI format for triggering CSI reporting is received and simultaneously the condition of the predefined valid CSI reference resource is satisfied (e.g., aperiodic CSI reporting).

Therefore, the present invention proposes a method of guaranteeing stable CSI derivation and reporting of the UE regardless of whether the UE has successfully received a radio resource reconfiguration message, in the case in which a plurality of cells dynamically changes usage of a radio resource according to a system overhead state of the cells and informs the UE of information about change of usage of the radio resource through a reconfiguration message of a predefined format.

As an example, in order to guarantee stable CSI derivation and reporting of the UE in the above-described cases (i.e., Case A, Case B, Case C, and Case D of FIGS. 9A to 9D), a rule for determining the location of the valid CSI reference resource linked with CSI reporting of a specific timing, a rule for a condition that should be satisfied to be considered as the valid CSI reference resource, and/or a rule for an assumption about UL-DL configuration used to determine the location of the valid CSI reference resource (i.e., a fallback operation of UL-DL configuration) needs to be (re)defined.

In addition, the location of the valid CSI reference resource linked with CSI reporting of a specific timing may be regarded as the nearest subframe which corresponds to a previous timing including a predetermined value starting from a CSI reporting timing and simultaneously satisfies a condition of a predefined valid CSI reference resource, a subframe which corresponds to a timing prior to the predefined value starting from the CSI reporting timing and simultaneously satisfies the condition of the predefined valid CSI reference resource, or a subframe in which a CSI request field of a UL DCI format for triggering CSI reporting is received and simultaneously the condition of the predefined valid CSI reference resource is satisfied.

Embodiments described below may be extensively applied to a situation in which periodic CSI reporting operation is configured and/or a situation in which aperiodic CSI reporting operation is triggered. The embodiments may also be extensively applied to a situation in which various transmission modes (TMs) (e.g., TMs 1 to 9 or TM 10) are configured and/or a situation in which various numbers of CSI processes (e.g., 1, 2, 3, and 4 CSI processes) are configured.

First Embodiment

According to the first embodiment of the present invention, the location of a valid CSI reference resource linked with CSI reporting of a specific timing may be determined based on an assumption about a specific UL-DL configuration among UL-DL configurations (i.e., Options #A to #D) numerated below.

[Option #A] UL-DL configuration of an SIB

[Option #B] UL-DL configuration of a predefined reference UL HARQ timeline

[Option #C] UL-DL configuration of a predefined reference DL HARQ timeline

[Option #D] UL-DL configuration (re)configured by a reconfiguration message

In addition, it will be assumed hereinbelow that a condition of the valid CSI reference resource is a DL subframe and/or a special subframe (e.g., DwPTS). However, in this embodiment, when a specific TM (e.g., TM 10) is configured and/or the reconfiguration message has a physical layer signal format (e.g., explicit L1 signaling of reconfiguration by a UE-group-common (e)PDCCH), the condition of the valid CSI reference resource may not be limited to the DL subframe and/or the special subframe (e.g., all of the DL subframe (and/or the special subframe (e.g., DwPTS)) and a UL subframe (and/or a special subframe (e.g., UpPTS)) may be considered).

While an assumption about UL-DL configuration used to determine the location of the valid CSI reference resource according to the first embodiment may be commonly applied to Case A, Case B, Case C, and Case D described with reference to FIGS. 9A to 9D, the assumption about UL-DL configuration may be independently applied to Case A, Case B, Case C, and Case D (e.g., an assumption about UL-DL configuration applied to some cases (e.g., Case C) is different from an assumption about UL-DL configuration applied to the other cases (e.g., Case A, Case B, and Case D)).

Hereinafter, for convenience of description of the present invention, it will be assumed that a reconfiguration message of a specific timing has not been successfully received in a situation in which the location of the valid CSI reference resource is determined based on a DL subframe (and/or special subframe (e.g., DwPTS)) of UL-DL configuration (re)configured by the reconfiguration message (i.e., Option #D). However, it is apparent that the present invention may be extended to the case in which the reconfiguration message of a specific timing has not been successfully received in a situation in which the assumption about UL-DL configuration used to determine the location of the valid CSI reference resource is defined in a different form from the above case (e.g., in Option #C).

That is, i) in a situation in which the location of the valid CSI reference resource is determined based on the DL subframe (and/or the special subframe (e.g., DwPTS)) of UL-DL configuration (re)configured by the reconfiguration message or ii) in a situation in which the location of the valid CSI reference resource is determined based on the DL subframe (and/or special subframe (e.g., DwPTS)) of UL-DL configuration of a predefined reference DL HARQ timeline, if the reconfiguration message of a specific timing has not been successfully received, an assumption about UL-DL configuration used to determine the location of the valid CSI reference resource and a subframe satisfying the condition of the valid CSI reference resource with respect to each case may be configured as Embodiment 1-1 to Embodiment 1-15 described below.

Embodiment 1-1

According to the present invention, if the location of the valid CSI reference resource linked with CSI reporting of a specific timing belongs to a duration during which resource usage is determined from a reception failed reconfiguration message (i.e., Case C or Case D of FIGS. 9A to 9D), the location of the valid CSI reference resource linked with CSI reporting of a specific timing may be determined in consideration of only DL subframes and/or special subframes (e.g., DwPTS) of UL-DL configuration (i.e., [Option #A]) of an SIB.

Embodiment 1-2

According to the present invention, if the location of the valid CSI reference resource linked with CSI reporting of a specific timing belongs to a duration during which resource usage is determined from a reception failed reconfiguration message (i.e., Case C or Case D), the location of the valid CSI reference resource linked with CSI reporting of a specific timing may be determined in consideration of only DL subframes and/or special subframes (e.g., DwPTS) of UL-DL configuration (i.e., [Option #B]) of a predefined reference UL HARQ timeline.

Embodiment 1-3

According to the present invention, if the location of the valid CSI reference resource linked with CSI reporting of a specific timing belongs to a duration during which resource usage is determined from a reception failed reconfiguration message (i.e., Case C or Case D), the location of the valid CSI reference resource linked with CSI reporting of a specific timing may be determined in consideration of only DL subframes and/or special subframes (e.g., DwPTS) of UL-DL configuration (i.e., [Option #C]) of a predefined reference DL HARQ timeline.

Embodiment 1-4

According to the present invention, if the location of the valid CSI reference resource linked with CSI reporting of a specific timing belongs to a duration during which resource usage is determined from a reception failed reconfiguration message (i.e., Case C or Case D), the location of the valid CSI reference resource linked with CSI reporting of a specific timing may be determined in consideration of only DL subframes and/or special subframes (e.g., DwPTS) of a (predefined) static resource set.

Embodiment 1-5

According to the present invention, if the location of the valid CSI reference resource linked with CSI reporting of a specific timing belongs to a duration during which resource usage is determined from a reception failed reconfiguration message (i.e., Case C or Case D), the location of the valid CSI reference resource linked with CSI reporting of a specific timing may be determined in consideration of only DL subframes and/or special subframes (e.g., DwPTS) of a duration during which resource usage is determined from a latest successfully received reconfiguration message.

Embodiment 1-6

According to the present invention, if the location of the valid CSI reference resource linked with CSI reporting of a specific timing belongs to a duration during which resource usage is determined from a reception failed reconfiguration message (i.e., Case C or Case D), CSI reporting may be omitted or CSI reporting may be performed using a specific predefined value (e.g., RI/PMI/CQI).

A method of omitting CSI reporting according to Embodiment 1-6 may be limitedly applied only to the case in which an eNB is configured to receive feedback (e.g., ACK/NACK information) as to whether the reconfiguration message has been successfully received from a UE. This is because, if the eNB cannot recognize information as to whether an individual UE has successfully received the reconfiguration message, the eNB does not accurately discern whether the UE has performed CSI reporting and/or whether rate matching has been applied to UL data mapping due to piggybacking of CSI on a PUSCH.

Embodiment 1-7

According to the present invention, if the location of the valid CSI reference resource linked with CSI reporting of a specific timing belongs to a duration during which resource usage is determined from a reception failed reconfiguration message (i.e., Case C or Case D), the CSI reporting may be performed using a latest successfully reported CSI value.

In this case, the latest successfully reported CSI value may be defined as one of i) a recent CSI reporting value based on DL subframes and/or special subframes (e.g., DwPTS) of a duration during which resource usage is determined from a latest successfully received reconfiguration message, ii) a recent CSI reporting value based on DL subframes and/or special subframes (e.g., DwPTS) of UL-DL configuration of an SIB, iii) a recent CSI reporting value based on DL subframes and/or special subframes (e.g., DwPTS) of UL-DL configuration of a predefined reference UL HARQ timeline, iv) a recent CSI reporting value based on DL subframes and/or special subframes (e.g., DwPTS) of UL-DL configuration of a predefined reference DL HARQ timeline, and v) a recent CSI reporting value based on DL subframes and/or special subframes (e.g., DwPTS) of a (predefined) static resource set.

Embodiment 1-8

According to the present invention, if the location of the valid CSI reference resource linked with CSI reporting of a specific timing belongs to a duration during which resource usage is determined from a reception failed reconfiguration message (i.e., Case C or Case D), CSI reporting may be performed (re)using a valid CSI reference resource of latest successfully performed CSI reporting.

For example, the latest successfully performed CSI reporting may be defined as one of i) recent CSI reporting based on DL subframes and/or special subframes (e.g., DwPTS) of a duration during which resource usage is determined from a latest successfully received reconfiguration message, ii) recent CSI reporting based on DL subframes and/or special subframes (e.g., DwPTS) of UL-DL configuration of an SIB, iii) recent CSI reporting based on DL subframes and/or special subframes (e.g., DwPTS) of UL-DL configuration of a predefined reference UL HARQ timeline, iv) recent CSI reporting based on DL subframes and/or special subframes (e.g., DwPTS) of UL-DL configuration of a predefined reference DL HARQ timeline, and v) recent CSI reporting based on DL subframes and/or special subframes (e.g., DwPTS) of a (predefined) static resource set.

Further, if Embodiment 1-8 is applied in a situation in which TM 10 is configured, a latest successfully performed CSI reporting value and a CSI reporting value of a specific timing (after) (re)using a valid CSI reference resource of latest successfully performed CSI reporting may have different values.

That is, since the CSI reporting value of a specific timing (after) (re)using the valid CSI reference resource of latest successfully performed CSI reporting is a result of interpolating channel/interference in the valid CSI reference resource (i.e., the valid CSI reference resource of latest successfully performed CSI reporting) based on measurement information additionally obtained after the valid CSI reference resource of latest successfully performed CSI reporting, the CSI reporting value of a specific timing (after) (re)using the valid CSI reference resource of latest successfully performed CSI reporting may be different from the latest successfully performed CSI reporting value.

Embodiment 1-9

According to the present invention, if the location of the valid CSI reference resource linked with CSI reporting of a specific timing belongs to a duration during which resource usage is determined from a reception failed reconfiguration message (i.e., Case C or Case D), valid CSI reference resources may be regarded as being absent in a duration during which resource usage is determined from the reception failed reconfiguration message.

For example, when Embodiment 1-9 is applied, the location of the valid CSI reference resource linked with CSI reporting of a specific timing may be determined in consideration of only i) DL subframes and/or special subframes (e.g., DwPTS) of a duration during which resource usage is determined from a latest successfully received reconfiguration message, ii) DL subframes and/or special subframes (e.g., DwPTS) of a duration during which resource usage is determined from the latest successfully received reconfiguration message and simultaneously DL subframes and/or special subframes (e.g., DwPTS) of UL-DL configuration of an SIB, iii) DL subframes and/or special subframes (e.g., DwPTS) of a duration during which resource usage is determined from the latest successfully received reconfiguration message and simultaneously DL subframes and/or special subframes (e.g., DwPTS) of UL-DL configuration of a predefined reference UL HARQ timeline, iv) DL subframes and/or special subframes (e.g., DwPTS) of a duration during which resource usage is determined from the latest successfully received reconfiguration message and simultaneously DL subframes and/or special subframes (e.g., DwPTS) of UL-DL configuration of a predefined reference DL HARQ timeline, or v) DL subframes and/or special subframes (e.g., DwPTS) of a duration during which resource usage is determined from the latest successfully received reconfiguration message and simultaneously DL subframes and/or special subframes (e.g., DwPTS) of a (predefined) static resource set.

When Embodiment 1-9 is applied, Embodiments 1 to 9 may be combined with one of Embodiments 1-6, 1-7, and 1-8 may be applied.

Embodiment 1-10

According to the present invention, if the location of the valid CSI reference resource linked with CSI reporting of a specific timing belongs to a duration during which resource usage is determined from a reception failed reconfiguration message (i.e., Case C or Case D) and Embodiment 1-1 to Embodiment 1-9 of the present invention are applied, subframes except for subframes satisfying a condition of a predefined valid CSI reference resource are regarded as an invalid CSI reference resource (e.g., a UL subframe and/or UpPTS of a special subframe).

Embodiment 1-11

According to the present invention, if the location of the valid CSI reference resource linked with CSI reporting of a specific timing belongs to a duration during which resource usage is determined from the successfully received reconfiguration message (i.e., Case A or Case B), the location of the valid CSI reference resource linked with CSI reporting of a specific timing may be determined in consideration of only DL subframes and/or special subframes (e.g., DwPTS) of a duration during which resource usage is determined from the reconfiguration message.

Embodiment 1-12

According to the present invention, if the location of the valid CSI reference resource linked with CSI reporting of a specific timing belongs to a duration during which resource usage is determined from the successfully received reconfiguration message (i.e., Case A or Case B), one of Embodiment 1-1 to Embodiment 1-4 described above may be applied. For a description of the above case, refers to the contents described in Embodiment 1-1 to Embodiment 1-4.

Embodiment 1-13

According to the present invention, if a CSI reporting timing belongs to a duration during which resource usage is determined from a reception failed reconfiguration message, a specific embodiment of Embodiment 1-1 to Embodiment 1-5 may be applied. For a detailed description, refer to the contents described in Embodiment 1-1 to Embodiment 1-5.

The location of the valid CSI reference resource linked with CSI reporting of a corresponding timing may be configured to be determined in consideration of only i) DL subframes and/or special subframes (e.g., DwPTS) of UL-DL configuration of an SIB, ii) DL subframes and/or special subframes (e.g., DwPTS) of UL-DL configuration of a predefined reference UL HARQ timeline, iii) DL subframes and/or special subframes (e.g., DwPTS) of UL-DL configuration of a predefined reference DL HARQ timeline, iv) DL subframes and/or special subframes (e.g., DwPTS) of a predefined static resource set, or v) DL subframes and/or special subframes (e.g., DwPTS) of a duration during which resource usage is determined from a successfully received reconfiguration message.

Determination of the location of the valid CSI reference resource linked with CSI reporting of a corresponding timing based on one of Embodiment 1-1 to Embodiment 1-4 is effective i) when communication is limitedly performed only in DL subframes and/or special subframes (e.g., DwPTS) of UL-DL configuration of an SIB in a duration during which resource usage is determined from a reception failed reconfiguration message, ii) when communication is limitedly performed only in DL subframes and/or special subframes (e.g., DwPTS) of UL-DL configuration of a predefined reference UL HARQ timeline, iii) when communication is limitedly performed only in DL subframes and/or special subframes (e.g., DwPTS) of UL-DL configuration of a predefined reference DL HARQ timeline, or iv) when communication is limitedly performed only in DL subframes and/or special subframes (e.g., DwPTS) of a (predefined) static resource set.

This is because the eNB may obtain a CSI value based on a valid CSI reference resource having the same or similar interference characteristic as or to DL communication actually performed in the duration during which resource usage is determined from the reception failed reconfiguration message.

Embodiment 1-14

According to the present invention, if a CSI reporting timing belongs to a duration during which resource usage is determined from a reception failed reconfiguration message, a specific embodiment of Embodiment 1-6 to Embodiment 1-9 may be applied. For a detailed description, refer to the contents described in Embodiment 1-6 to Embodiment 1-9.

For example, if a CSI reporting timing belongs to a duration during which resource usage is determined from the reception failed reconfiguration message, i) corresponding CSI reporting is omitted, ii) corresponding CSI reporting is performed using a specific predefined value (e.g., RI/PMI/CQI), iii) corresponding CSI reporting is performed using a latest successfully reported CSI value, iv) corresponding CSI reporting is performed (re)using a valid CSI reference resource of latest successfully performed CSI reporting, or v) valid CSI reference resources are regarded as being absent in a duration during which resource usage is determined from the reception failed reconfiguration message.

Aperiodic CSI Reporting in Case of Failing to Receive Reconfiguration Message

The present invention also proposes a method of stably guaranteeing aperiodic CSI reporting based on a CSI request field of a random access response (RAR) grant when a reconfiguration message of a specific timing has not been successfully received in a situation in which the location of a valid CSI reference resource is configured to be determined based on a DL subframe and/or a specific subframe (e.g., DwPTS) of UL-DL configuration (re)configured by the reconfiguration message. However, it is apparent that the present invention may be extended to the case in which the reconfiguration message of the specific timing has not been successfully received in a situation in which an assumption about a UL-DL configuration used to determine the location of the valid CSI reference resource is defined in a different form (e.g., Option #A, Option #B, or Option #C) from the above case.

Legacy aperiodic CSI reporting based on the CSI request field of the RAR grant is performed based on a subframe which corresponds to a timing prior to a predefined value (e.g., 4 ms or 5 ms) and simultaneously satisfies the condition of a predefined valid CSI reference resource as a corresponding CSI reporting timing. However, since usage of subframes determined by the reconfiguration message is not clearly recognized due to reception failure of the reconfiguration message, an ambiguity problem as to whether corresponding aperiodic CSI reporting should be (actually) performed, an ambiguity problem how to determine the location of the valid CSI reference resource linked with corresponding aperiodic CSI reporting, or an ambiguity problem as to which assumption about UL-DL configuration is based on to determine the location of the valid CSI reference resource of corresponding aperiodic CSI reporting occurs.

Accordingly, in order to stably guarantee aperiodic CSI reporting based on the CSI request field of the RAR grant, an assumption about UL-DL configuration used to determine the location of the valid CSI reference resource (linked with corresponding aperiodic CSI reporting) and a subframe satisfying the condition of the valid CSI reference resource may be configured as in Embodiment 1-15 to Embodiment 1-18 described below.

Embodiment 1-15

According to the present invention, aperiodic CSI reporting based on the CSI request field of the RAR grant may be configured to be performed based on i) a nearest subframe which corresponds to a previous timing including a predefined value starting from a corresponding aperiodic CSI reporting timing and simultaneously satisfies the condition of a predefined valid CSI reference resource or ii) a subframe in which the CSI request field of the PAR grant for triggering corresponding aperiodic CSI reporting is received and simultaneously satisfies the condition of the predefined valid CSI reference resource.

In this case, one of Embodiment 1-1 to Embodiment 1-5 may be applied to the assumption about UL-DL configuration used to determine the location of the valid CSI reference resource linked with corresponding aperiodic CSI reporting and the condition of the valid CSI reference resource. For a detailed description, refer to the contents described in Embodiment 1-1 to Embodiment 1-5.

For example, the location of the valid CSI reference resource linked with aperiodic CSI reporting may be configured to be determined in consideration of only i) DL subframes and/or special subframes (e.g., DwPTS) of UL-DL configuration of an SIB, ii) DL subframes and/or special subframes (e.g., DwPTS) of UL-DL configuration of a predefined reference UL HARQ timeline, iii) DL subframes and/or special subframes (e.g., DwPTS) of UL-DL configuration of a predefined reference DL HARQ timeline, iv) DL subframes and/or special subframes (e.g., DwPTS) of a (predefined) static resource set, or v) DL subframes and/or special subframes (e.g., DwPTS) of a duration during which resource usage is determined from a latest successfully received reconfiguration message.

Embodiment 1-16

According to the present invention, one of Embodiment 1-6 to Embodiment 1-9 may be applied. For example, if the location of the valid CSI reference resource linked with aperiodic CSI reporting based on the CSI request field of the RAR grant belongs to a duration during which resource usage is determined from a reception failed reconfiguration message, i) corresponding aperiodic CSI reporting is omitted, ii) corresponding aperiodic CSI reporting is performed using a specific predefined value (e.g., RI/PMI/CQI), iii) corresponding aperiodic CSI reporting is performed using a latest successfully reported aperiodic CSI value, iv) corresponding aperiodic CSI reporting is performed (re)using a valid CSI reference resource of latest successfully performed CSI reporting, or v) valid CSI reference resources are regarded as being absent in a duration during which resource usage is determined from the reception failed reconfiguration message.

Embodiment 1-17

According to the present invention, aperiodic CSI reporting based on the CSI request field of the RAR grant may be configured to be performed based on a subframe which corresponds to a timing prior to a predefined value starting from a corresponding aperiodic CSI reporting timing and simultaneously satisfies the condition of a predefined valid CSI reference resource.

In addition, in Embodiment 1-17, when a subframe prior to a predefined value from the aperiodic CSI reporting timing does not satisfies the condition of the (predefined) valid CSI reference resource, corresponding aperiodic CSI reporting may be configured to be omitted.

In this case, the assumption about UL-DL configuration used to determine the location of the valid CSI reference resource linked with corresponding aperiodic CSI reporting and the condition of the valid CSI reference resource may conform to one of Embodiment 1-1 to Embodiment 1-5. For a detailed description, refer to the contents described in Embodiment 1-1 to Embodiment 1-5.

Specifically, (the location of) the valid CSI reference resource linked with corresponding aperiodic CSI reporting may be determined in consideration of only i) DL subframes and/or special subframes (e.g., DwPTS) of UL-DL configuration of an SIB, ii) DL subframes and/or special subframes (e.g., DwPTS) of UL-DL configuration of a predefined reference UL HARQ timeline, iii) DL subframes and/or special subframes (e.g., DwPTS) of UL-DL configuration of a predefined reference DL HARQ timeline, iv) DL subframes and/or special subframes (e.g., DwPTS) of a (predefined) static resource set, or v) DL subframes and/or special subframes (e.g., DwPTS) of a duration during which resource usage is determined from a latest successfully received reconfiguration message.

Embodiment 1-18

In the present invention, at least one of Embodiments 1-15 to 1-17 of the present invention may be configured to be limitedly applied only when aperiodic CSI reporting based on the CSI request field of the RAR grant corresponds to i) some cases of FIGS. 9A to 9D (i.e., some of Cases A, B, C, and D) or ii) all cases of FIGS. 9A to 9D (i.e., Case A, Case B, Case C, and Case D).

Second Embodiment

According to the second embodiment of the present invention, when the location of the valid CSI reference resource linked with CSI reporting of a specific timing is determined/detected based on predefined configurations/rules, such a location determination/detection operation may be configured to be performed only in a predefined time window. For example, when the location of the valid CSI reference resource linked with CSI reporting of a specific timing is determined/detected based on predefined configurations/rules based on at least one of i) configuration for determining the valid CSI reference resource linked with CSI reporting, ii) configuration about a condition that should be satisfied to be considered as a valid CSI reference resource, and iii) configuration about an assumption about a UL-DL configuration (or resource usage configuration information) used to determine the location of the valid CSI reference resource, such determination/detection may be configured to be performed in the predefined time window.

The above method may also be used to prevent inaccurate (or outdated) CSI reporting from being performed when the location of the valid CSI reference resource of unlicensed band related CSI reporting (of an unlicensed band) performed at a specific timing is set to a very old timing in the case in which an LTE system (re)uses a specific channel (e.g., an unlicensed band) of a Wi-Fi band by occupying the channel aperiodically (or with an irregular (transmission opportunity (TxOP)) length) (on a sensing basis). For example, the unlicensed band related valid CSI reference resource may be configured to be limitedly present only in a sensing based TxOP duration (e.g., DL subframe) and a UE may detect the valid CSI reference resource in the corresponding duration.

Additionally, the above method may be extended to a non-fallback mode as well as a fallback mode.

For example, a start point of the time window (hereinafter, "TW_START") may be set to one of i) a CSI reporting timing, ii) a subframe prior to a predefined value (e.g., 4 ms or 5 ms) starting from the CSI reporting timing, iii) a subframe in which a CSI request filed for triggering CSI reporting is received, iv) a subframe which corresponds to a timing prior to the predefined value starting from the CSI reporting timing and simultaneously satisfies the condition of the predefined valid CSI reference resource, v) a nearest subframe which corresponds to a previous timing including the predefined value starting from the CSI reporting timing and simultaneously satisfies the condition of the predefined valid CSI reference resource, and vi) a subframe in which the CSI request field for triggering CSI reporting is received and simultaneously the condition of the predefined valid CSI reference resource is satisfied.

In addition, the size of the time window (hereinafter, "TW_SIZE") determines a (total) duration for detecting/deriving the location of the valid CSI reference resource linked with CSI reporting of a specific timing from a predefined TW_START. Therefore, the location of the valid CSI reference resource of a specific timing is detected/derived within a "duration from TW_START to TW_START−TW_SIZE" according to TW_START and TW_SIZE.

An eNB may be configured to inform a UE of information about TW_START and/or information about TW_SIZE through a predefined signal (e.g., a physical layer signal or a higher layer signal). Alternatively, the eNB may cause the UE to implicitly discern TW_START and/or TW_SIZE based on a predefined configuration/rule (e.g., TW_SIZE may be set to be implicitly defined as a duration from TW_START to the first subframe of a nearest previous radio frame).

Third Embodiment

At least one method/embodiment/configuration disclosed in the first embodiment or the second embodiment of the present invention may be configured to be limitedly configured to partial predefined cases or partial parameters. According to the third embodiment, the case in which at least one method/embodiment/configuration disclosed in the first or second embodiment is applied is as follows.

The embodiments of the present invention may be configured to be limitedly applied only to the case in which a specific CSI reporting method (e.g., periodic CSI reporting or aperiodic CSI reporting) is configured or triggered.

The embodiments of the present invention may be configured to be limitedly applied only to the case in which a specific CSI reporting mode (e.g., a PUCCH reporting mode corresponding to periodic CSI reporting or a PUSCH reporting mode corresponding to aperiodic CSI reporting) is configured. In this case, the PUCCH reporting mode may be, for example, Mode 1-0, Mode 1-1, Mode 2-0, or Mode 2-1 and the PUSCH reporting mode may be, for example, Mode 1-2, Mode 2-0, Mode 2-2, Mode 3-0, or Mode 3-1.

The embodiments of the present invention may be configured to be limitedly applied only to the case in which the condition of the valid CSI reference resource is set to DL subframes and/or special subframes (e.g., DwPTS) rather than an MBSFN subframe.

The embodiments of the present invention may be configured to be limitedly applied only to the case in which a specific TM is configured and/or a specific special subframe configuration is designated.

The embodiments of the present invention may be configured to be limitedly applied depending on whether a predefined reference signal (e.g., a CRS or a CSI-RS) is transmitted in a DL subframe and/or a special subframe (e.g., DwPTS) of a flexible resource set. That is, the embodiments of the present invention may be limitedly applied depending on whether a specific control channel (e.g., PDCCH) can be transmitted or a specific TM can be configured.

The embodiments of the present invention may be configured to be limitedly applied according to a configuration type of a TM applied to the DL subframe and/or the special subframe (e.g., DwPTS) of the flexible resource set. For example, the embodiments of the present invention may be configured to be limitedly applied only to the case in which a TM (e.g., TM 4) requiring decoding of a CRS based DL data channel (PDSCH) is configured.

The embodiments of the present invention may be configured to be limitedly applied only to the case in which a specific number of CSI processes is configured.

The embodiments of the present invention may be configured to be limitedly applied only to a specific system environment (e.g., an FDD system or a TDD system).

The embodiments of the present invention may be configured to be limitedly applied only to an RRC_CONNECTED mode or IDLE mode of the UE.

The embodiments of the present invention may be configured to be limitedly applied only to the case in which a dynamic change mode of radio resource usage is configured.

The embodiments of the present invention may be configured to be limitedly applied only to the case in which the eNB is configured to receive, from the UE, feedback as to whether the reconfiguration message has been successfully received.

The embodiments of the present invention may be configured to be limitedly applied only to a specific component carrier (CC) or a specific cell (e.g., a PCell or an SCell) in which a dynamic change mode of radio resource usage is configured in an environment in which CA is applied.

Although the above-described embodiments may be independently implemented, they may be implemented as a combination/aggregate of one or more embodiments.

The eNB may inform the UE of information about the above-described rules/configurations/embodiments of the present invention or information as to whether the rules/configurations/embodiments are applied through a predefined signal (e.g., a physical layer or higher layer signal).

In addition, the embodiments of the present invention may be extended to an independent CSI reporting configuration per resource set (e.g., static (DL) resource set or flexible (DL) resource set) of a different interference characteristic, i.e., at least one of the cases in which i) a CSI reporting mode is defined, ii) a CSI reporting method is defined, and iii) a periodic CSI reporting related period and a subframe offset parameter are defined. The CSI reporting mode includes, for example, a PUCCH reporting mode (i.e., Mode 1-0, Mode 1-1, Mode 2-0, Mode 2-1) corresponding periodic CSI reporting and a PUSCH reporting mode (i.e., Mode 1-2, Mode 2-0, Mode 2-2, Mode 3-0, Mode 3-1) corresponding to aperiodic CSI reporting. The CSI reporting method may include, for example, periodic CSI reporting or aperiodic CSI reporting. The case in which the periodic CSI reporting related period and the subframe offset parameter are defined includes, for example, resource-specific CSI measurement or restricted CSI measurement.

The condition of the valid CSI reference resource of CSI reporting linked with a specific resource set according to an embodiment of the present invention i) may be (re)interpreted as/(re)restricted to DL subframes and/or special subframes (e.g., DwPTS) of the specific resource set or ii) may be (re)interpreted as/(re)restricted to subframes included in the specific resource set among DL subframes and/or special subframes (e.g., DwPTS) based on which an assumption about UL-DL configuration is made to determine the location of the valid CSI reference resource.

The above-described embodiments of the present invention may be extended even to the case in which the LTE system (re)uses a specific channel (e.g., an unlicensed band) of a Wi-Fi band occupied aperiodically (or with an irregular duration (TxOP) length (on a sensing basis)).

Fourth Embodiment

In the fourth embodiment of the present invention, a method of efficiently estimating and transmitting CSI by the UE when usage of a radio resource is dynamically changed according to an overhead state of a system. The CSI means periodic CSI (P-CSI) and/or aperiodic CSI (A-CSI). The embodiments of the present invention may be extended to the case in which the P-CSI is transmitted through a UL control channel (PUCCH), the P-CSI is transmitted through piggybacking on a UL data channel (PUSCH), and/or the A-CSI is transmitted through the UL data channel (PUSCH).

Hereinafter, the embodiments of the present invention will be described based on a 3GPP LTE system for convenience of description. However, the range of a system to which the present invention is applied may be extended to other systems in addition to the 3GPP LTE system. The embodiments of the present invention may be extended to the case in which resource usage on a specific cell (or CC) is dynamically changed according to an overhead state of a system in an environment in which CA is applied. In addition, the embodiments of the present invention may be extended to the case in which usage of a radio resource is dynamically changed in a TDD system or an FDD system.

When the UE has not successfully received a reconfiguration message transmitted by the eNB, the UE may be configured to perform at least one of i) a CSI measurement operation, ii) a PDCCH monitoring operation, iii) a PDSCH reception operation, and iv) a PUSCH transmission operation, based on UL-DL configuration of SIB type 1 (SIB1).

In the channel measurement operation, when the UE decodes explicit L1 signaling of reconfiguration and detects valid UL-DL configuration, the UE measures CSI only in subframes indicated as DL subframes or special subframes by explicit L1 signaling of reconfiguration. If the UE does not detect L1 signaling for transmitting valid UL-DL configuration for a radio frame, the UE may measure the CSI only in subframes indicated as DL subframes or special subframes by SIB configuration. In the PDCCH or PDSCH reception operation, upon detecting L1 signaling for transmitting valid UL-DL configuration for a radio frame, the UE monitors |non-DRX DL subframes or special subframes indicated by explicit L1 signaling. Upon not detecting L1 signaling for transmitting valid UL-DL configuration for the radio frame, the UE monitors the non-DRX DL subframes or special subframes for a PDCCH or an EPDCCH indicated by SIB-1 configuration.

Valid UL-DL configuration will now be described. DL HARQ reference configuration may be selected from Rel-8 TDD UL-DL configurations {2, 4, 5}. For the UE configured with TDD eIMTA (further enhancements to LTE TDD for DL-UL interference management and traffic adaptation), a UL scheduling timing and a HARQ timing conform to UL-DL configuration signaled through SIB1. For valid UL HARQ reference configuration or DL HARQ reference configuration, the UE may regard a UL subframe or a special subframe in DL HARQ reference configuration as not being dynamically used as a DL subframe or may regard a DL subframe or a special subframe in UL HARQ reference configuration as not being dynamically used as a UL subframe.

UL grant validation will now be described. In a fallback mode, upon receiving a UL grant corresponding to at least one UL subframe per SIB1 not included in a set of UL subframes per DL HARQ reference configuration, the UE may determine that the UL grant is valid control information (valid grant). However, upon receiving NACK in a PHICH triggering PUSCH transmission in a UL subframe per SIB1 which is not included in a set of UL subframes per DL HARQ reference configuration, the UE transmits a PUSCH. SRS transmission validation will now be described. For type 1 STS, determination of a transmission scheduled subframe of type 1 SRS when triggered is performed based on SIB1. For both type 0 SRS and type 1 SRS, SRS transmission may be performed in a UL subframe or a UpPTS based on SIB1.

That is, the above-described operations of i) to iv) are referred to as a "fallback operation" (or "fallback mode"). Through the fallback operation, the eNB may minimize i) damage of interference generated from a UE which has not successfully received a reconfiguration message (e.g., false detection of PDCCH/EPDCCH) on communication between another UE and an eNB (or a legacy UE and an eNB) or ii) malfunction of a UE which has not successfully received the reconfiguration message (e.g., DL HARQ buffer corruption).

TABLE 6-1

CSI Measurement Operation

When a UE decodes explicit L1 signaling of reconfiguration correctly and detects a valid UL-DL configuration, the UE shall measure CSI only within the subframes indicated as DL subframe or special subframe by the explicit L1 signaling of reconfiguration.
If UE does not detect L1 signaling conveying a valid UL-DL configuration for a radio frame, the UE shall measure CSI only within the subframes indicated as DL subframe or special subframe by SIB configuration.
PDCCH (and/or PDSCH) Monitoring (or Reception) Operation
If UE detects L1 signaling conveying a valid UL-DL configuration for a radio frame, UE shall monitor the non-DRX DL subframes or special subframes indicated by explicit L1 signaling.
If UE does not detect L1 signaling conveying a valid UL-DL configuration for a radio frame,
UE shall monitor the non-DRX DL subframes or special subframes for PDCCH or EPDCCH as indicated by SIB-1 configuration.
Valid UL-DL Configuration Determination DL HARQ reference configuration can choose from Rel-8 TDD UL-DL configurations {2, 4, 5}.
For UE configured with TDD eIMTA, uplink scheduling timing and HARQ timing follow UL-DL configuration signaled in SIB1.
For valid UL & DL reference configurations:
The set of UL subframes of the DL HARQ reference configuration should be a subset of the UL subframes of the UL HARQ reference UL/DL configuration.
For validity of UL/DL configuration in a reconfiguration DCI under any valid UL & DL HARQ reference configurations:
The UE should not expect any subframe configured as UL subframe or special subframe in DL HARQ reference configuration is dynamically used as a DL subframe.
The UE should not expect any subframe configured as DL subframe or special subframe in UL HARQ reference configuration is dynamically used as a UL subframe.

TABLE 6-1-continued

UL Grant Validation

Under fallback, if the UE receives a UL grant corresponding to at least one UL subframe per SIB1 not in the set of UL subframes per DL HARQ reference configuration, the UE still treats it as a valid grant.
Under fallback, if the UE receives a NAK in PHICH triggering PUSCH transmission in a UL subframe per SIB1 not in the set of UL subframes per DL HARQ reference configuration, the UE transmits PUSCH.
SRS Transmission Validation For type 1 SRS, the determination of the subframe where the type 1 SRS is due for transmission when triggered is based on SIB1.
For both type 0 and type 1 SRS, SRS transmissions can be configured in a UL subframe or UpPTS based on SIB1.
If a UE detects L1 signaling conveying a valid UL-DL configuration for radio frame(s), and if the UL subframe or UpPTS for SRS transmission is changed to DL subframe, the UE shall drop the SRS transmission.
If a UE does not detect L1 signaling conveying a valid UL-DL configuration for radio frame(s),
The UE still transmits the type 1 SRS in uplink subframes and special subframes indicated based on SIB1, but the UE shall drop the type 0 SRS transmission in a subframe not indicated as UL subframe or UpPTS by the DL-HARQ reference configuration if there is no PUSCH transmission in the same subframe.

---

A method of performing a separate CSI-IM operation for interference having different characteristics will now be described focusing on a method of configuring a plurality of CSI measurement subframe sets (CSI-IM option #A).

For example, a serving cell may configure a resource-restricted CSI measurement operation or a resource-specific CSI measurement operation in consideration of interference having different characteristics received from a neighbor cell (e.g., a dominant interfering cell) performing a dynamic change operation of radio resource usage with respect to a UE (eIMTA UE). Whether the resource-restricted CSI measurement operation is applied is configured in the unit of a CSI process or a cell. The resource-restricted CSI measurement operation is implemented by signaling/configuring (a maximum of) two CSI measurement subframe sets in (one) CSI process or cell. The CSI measurement subframe sets may be commonly assumed/configured/signaled or differently configured/signaled between CSI processes or between cells.

Additionally, for the UE (eIMTA UE), if two CSI measurement subframe sets are configured for the resource-restricted CSI measurement operation, two CSI-IM resources in one CSI process (i.e., having one (non-zero power) CSI-RS resource) may be signaled (i.e., refer to Table 7) and each CSI-IM resource may be configured to be linked with an individual CSI measurement subframe set. The above methods may be interpreted such that it is assumed that minimum capability for configuring the number of CSI processes of the UE in which a dynamic change mode of radio resource usage (eIMTA mode) can be configured is 1. Further, methods described in Table 7 (i.e., Option #1, Option #2, and Option #3) may be individually applied or may be applied in the form of a combination thereof

TABLE 7

CSI-IM configuration in TM 10

In TM10, in order to support multiple CSI measuement of a UE with single CSI process, multiple CSI-IM configurations can be considered. In other words, CSI-IM resources can be configured for each measurement subframe set, e.g. CSI-IM0 for static subframe set and CSI-IM1 for flexible subframe set. Then, a UE can make separate CSIs using 1 CSI-RS configuration and 2 CSI-IM configurations, and the two-set CSI can be measured and reported in TDD eMTA with TM 10 in a framework common to the other TMs. One may claim that one CSI process with two CSI-IM configurations (case 1) is equivalent to two CSI processes (case 2) in the sense that UE anyway measures and reports two different CSI, but there exist substantial difference depending on the details of CSI process handling. First, it is always guaranteed in case 1 that the two CSI share the same NZP CSI-RS so that a UE does not need to be equipped with multiple channel measurement for CSI report, especially when the UE is capable of handling only one CSI process. Second, unless specified in the standard, the network is always able to configure two CSI subframe sets for each CSI process, so in case 2, the maximum CSI to be supported for the UE can increase to 4. Thus, without re-defining the CoMP UE capability and the configurability of CSI measurement subframe set, supporting multiple CSI in TDD eIMTA by configuring multiple CSI processes requires additional implementation complexity which is beyond what the current single-process-capable UE can support.
Another problem to solve for supporting separate CSI measurement is the restriction of CSI-IM configurations where all CSI-IM resources must be covered by one ZP CSI-RS configuration. Because ZP CSI-RS configuration has a periodicity of multiple of 5 ms, in most cases, only one interference condition (e.g. static SF or flexible SF) can be measured in TDD eIMTA. So, the restriction made in Rel-11 CoMP WI needs to be modified in Rel-12 TDD eIMTA. One way would be to maintain the restriction in the subframes where legacy UEs, including Rel-11 UEs, can expect CSI-IM configuration so that the existing restriction is still valid from their viewpoint. This implies that CSI-IMs configured on DL subframes indicated by SIB1 should be coverable TABLE 7-continued CSI-IM configuration in TM 10 by a ZP CSI-RS configuration while CSI-IMs configured on the other subframes are not subject to this restriction. Consequently the specified UE assumption can be changed across specification releases in a smooth manner.
[Option #1] Up to two CSI-IM configurations can be configured for a UE with single CSI process. Each subframe set can have own CSI-IM configuration.
[Option #2] The restriction of CSI-IM configurations where all CSI-IM resources must be covered by one ZP CSI-RS configuration can be removed on flexible subframes.
[Option #3] Minimum UE capability on the number of CSI processes for TDD eIMTA is one.

For convenience of description, the two CSI measurement subframe sets are referred to as "CSI Measurement SF Set 0 (i.e., $C_{CSI,0}$)", and "CSI Measurement SF Set #1 (i.e., $C_{CSI,1}$)", respectively. In this case, CSI Measurement SF Set #0 (i.e., $C_{CSI,0}$) may be configured in consideration of a subframe set in which interference of a relatively static characteristic (or interference of a fixed characteristic) is received from a neighbor cell performing a dynamic change operation of radio resource usage and CSI Measurement SF Set #1 (i.e., $C_{CSI,1}$) may be configured in consideration of a subframe set in which interference of a relatively variant characteristic is received.

Specifically, the subframe set in which a neighbor cell performing the dynamic change operation of radio resource usage generates interference of a relatively static characteristic (or fixed characteristic) may be a subframe set that the neighbor cell uses for static usage (or fixed usage) (e.g., at least one of a DL subframe/special subframe set of SIB1 based UL-DL configuration, a DL subframe/special subframe set of UL HARQ reference configuration, and a UL subframe/special subframe set of DL HARQ reference configuration).

Meanwhile, the subframe set in which a neighbor cell generates interference of a relatively variant characteristic may be a subframe set in which the neighbor cell performs usage change. For example, the subframe set may be UL subframes/special subframes except for UL subframes/special subframes of DL HARQ reference configuration among UL subframes/special subframes of SIB1 based UL-DL configuration or DL subframes/special subframes of UL HARQ reference configuration. As another example, the subframe set in which the neighbor cell generates interference of a relatively variant characteristic may be DL subframes/special subframes except for DL subframes/special subframes of SIB1 based UL-DL configuration or DL subframes/special subframes of UL HARQ reference configuration among DL subframes/special subframes of DL HARQ reference configuration.

CSI Measurement SF Set #0 (i.e., $C_{CSI,0}$) and CSI Measurement SF Set #1 (i.e., $C_{CSI,1}$) may be configured in consideration of a subframe set for static or fixed usage and a subframe set in which the serving cell performs usage change, respectively.

Hereinafter, a separate CSI/IM operation for interference having different characteristics will be described focusing on a method of configuring a plurality of CSI processes (CSI/IM Option #B).

For example, a serving cell may be configured such that the UE (eIMTA UE) performs at least one of a separate CSI measurement operation, an interference estimation operation, and an interference averaging operation with respect to interference having different characteristics received from a neighbor cell performing a dynamic change operation of radio resource usage in a form different from that of Table 7. Specifically, if the UE (eIMTA/TM 10 UE) informs the eNB that the UE is capable of supporting a maximum of P CSI processes through "Capability Signaling", the UE may configure a maximum of N*P (although N may be set to a positive integer equal to or greater than 2, N will be assumed to be 2 for convenience of description) CSI processes from the eNB.

If 'N=2' and a total of 2*P CSI processes is configured for the UE (eIMTA UE) by the eNB, a combination of one specific non-zero power CSI-RS resource and one CSI-IM resource may be configured in the same manner as legacy Rel-11 CSI processes, limited only to a maximum of P CSI processes (e.g., from the first CSI process (i.e., CSI process index #1) to the P-th CSI process (i.e., CSI process index #P)) among a (maximum of) 2*P CSI processes. The other CSI processes (e.g., from the (P+1)-th CSI process (i.e., CSI process index #(P+1) to the (2*P)-th CSI process (i.e., CSI process index #(2*P)) may be configured to use some information (e.g., non-zero power CSI-RS resource configuration information) by pairing with one of the P CSI processes (e.g., from the first CSI process (i.e., CSI process index #1) to the P-th CSI process (i.e., CSI process index #P) in which a combination of one specific non-zero power CSI-RS resource and one CSI-IM resource is configured in the same manner as the legacy Rel-11 CSI processes according to predefined rule/configuration/signaling information (i.e., one CSI process is not paired with a plurality of CSI processes and one CSI process is mapped to one CSI process without overlap).

TABLE 8

Aperiodic CSI in TM10 for eIMTA

A UE capable of TM10 and eIMTA shall support the configuration of 2 CSI processes
If a UE indicated that it supports 1 CSI process for TM10, and the UE is configured with eIMTA
and 2 TM10 CSI processes, the UE should not expect:
The configuration of different NZP CSI-RS resources for the 2 CSI processes (i.e. CSI-RS-ConfigNZPId should be the same)
The configuration of RI-reference CSI process (ri-Ref-CSI-ProcessId)
(The configuration of CSI measurement subframe sets)
(The simultaneous A-CSI reports of two CSI processes by a single A-CSI trigger)
[Note] The above restrictions should be specified in order for the two CSI processes to TABLE 8-continued Aperiodic CSI in TM10 for eIMTA be equivalent to a single CSI process configured with two CSI measurement subframe
sets in terms of UE complexity.
(If a UE indicated that it supports 1 CSI process for TM10 and the UE is not configured with
eIMTA, the UE should not expect the configuration of more than 1 CSI process.)
(As in Rel-11 specifications, when more than one CSI process is configured, 2-bit CSI request
field will be used in DCI format 0 (in UE SS) and DCI format 4.)

Table 8 shows an example of using non-zero power CSI-RS resource configuration information after the other CSI process (e.g., the second CSI process (i.e., CSI process index #2)) is paired with one CSI process (e.g., the first CSI process (i.e., CSI process index #1)) in which a combination of one specific non-zero power CSI-RS resource and one CSI-IM resource is configured in the same manner as the legacy Rel-11 CSI processes according to predefined rule/configuration/signaling information in a situation in which 'P=1 and N=2' and a total of two CSI processes is configured for the UE (eIMTA UE) by the eNB.

In this case, in the other CSI process (e.g., second CSI process (i.e., CSI process index #2)), a CSI-IM resource different from one CSI process (e.g., the first CSI process (i.e., CSI process index #1)) in which a combination of one specific non-zero power CSI-RS resource and one CSI-IM resource is configured in the same manner as the legacy Rel-11 CSI processes is configured. The CSI processes are used to perform the separate CSI measurement operation, interference estimation operation, or interference averaging operation with respect to subframe sets of (implicitly) different interference characteristics. In other words, the CSI processes perform the same role as CSI Measurement SF Set #0 (i.e., $C_{CSI,0}$) and CSI Measurement SF Set #1 (i.e., $C_{CSI,1}$) described above.

As another example, pair mapping between 2*P CSI processes (i.e., from CSI process index #1 to CSI process index #2*P) may be performed according to predefined configuration. As a detailed example, specific CSI process index #k (where k∈{1, 2, . . . , P}) may be configured to perform pair mapping with CSI process index #(k+P) (i.e., specific CSI process index #k (where k∈{(P+1), (P+2), 2*P}) may be pair-mapped to CSI process index #(k mod P) (where "k mod P" is a remainder obtained by dividing k by P) or specific CSI process index #k (where k∈{1, 2, . . . , P}) may be configured to perform pair mapping with CSI process index #(k+O_{offset}) (where O_{offset} may be set to a positive integer other than 0). In this case, if the eNB signals/configures a total number of CSI processes by a value or an odd number less than 2*P for the UE (eIMTA UE), the UE may have CSI processes to which pair mapping is not actually applied and the corresponding CSI processes may be independently used (e.g., for CoMP).

Hereinafter, a method of efficiently reporting CSI when the UE performs a fallback operation will be proposed based on the above description. The embodiments of the present invention may be configured to be limitedly applied to a P-CSI reporting operation or an A-CSI reporting operation or may be configured to be applied to both the P-CSI reporting operation and the A-CSI reporting operation.

The following embodiments may be configured to be limitedly applied only to at least one of a CSI measurement operation, a PDCCH monitoring operation, a PDSCH reception operation, and a PUSCH (re)transmission operation, based on UL-DL configuration of SIB1 in a fallback mode, i.e., when a reconfiguration message has not been successfully received.

This is because, in a duration during which the fallback mode is performed, the UE performs the CSI measurement operation in consideration of only DL subframes and/or special subframes of SIB1 based UL-DL configuration and, in this case, there is a high probability that the DL subframes and/or the special subframes of SIB1 based UL-DL configuration are set to one specific CSI measurement subframe set (i.e., a subframe set in which interference of a relatively static (or fixed) characteristic is received from a neighbor cell or a subframe set used for static usage (or fixed usage) by a serving cell (hereinafter, CSI measurement subframe set #0 ($C_{CSI,0}$))).

In other words, in a duration during which the fallback mode is performed, only CSI reference resources for (P/A-) CSI reporting related to one specific CSI measurement subframe set (i.e., CSI measurement subframe set #0, $C_{CSI,0}$) are present and CSI reference resources for (P/A-) CSI reporting related to the other CSI measurement subframe set (i.e., a subframe set in which interference of a relatively variant characteristic is received from a neighbor cell or a subframe set in which a serving cell performs usage change (hereinafter CSI measurement subframe set #1 ($C_{CSI,1}$)) are not present. Accordingly, a method of efficiently processing (P/A-) CSI reporting related to the other CSI measurement subframe set (i.e., CSI measurement subframe set #1 ($C_{CSI,1}$)) is needed and the embodiments of the present invention may be applied to this case.

The embodiments of the present invention may be extended even to the case in which UL-DL configuration (re)designated by a reconfiguration message is the same as SIB1 based UL-DL configuration. That is, if UL-DL configuration (re)designated by the reconfiguration message is the same as SIB1 based UL-DL configuration, the problem in which CSI reference resources for (P/A-) CSI reporting related to the other CSI measurement subframe set (CSI measurement subframe set #1($C_{CSI,1}$)) are not present (i.e., in this case, the problem occurs regardless of a fallback mode and a non-fallback mode) occurs equally.

Additionally, the embodiments of the present invention may be applied to both the case in which at least one of a CSI measurement operation, a PDCCH monitoring operation, a PDSCH reception operation, and a PUSCH (re)transmission operation based on UL-DL configuration of SIB1 is performed in a fallback mode, i.e., when the UE has not successfully received the reconfiguration message and the case in which at least one of a channel measurement operation, a PDCCH monitoring operation, a PDSCH reception operation, and a PUSCH (re)transmission operation is performed based on a non-fallback mode, i.e., information about a successfully received reconfiguration message (i.e., reconfigured valid UL-DL configuration information).

The following embodiments may be configured to be limitedly applied only to some cases (e.g., Table 7 or 8) in which at least one of the CSI measurement operation, interference estimation operation, and interference averaging operation with respect to interference of the above-described different characteristics is performed or may be configured to be applied to all methods.

Figure 10A:
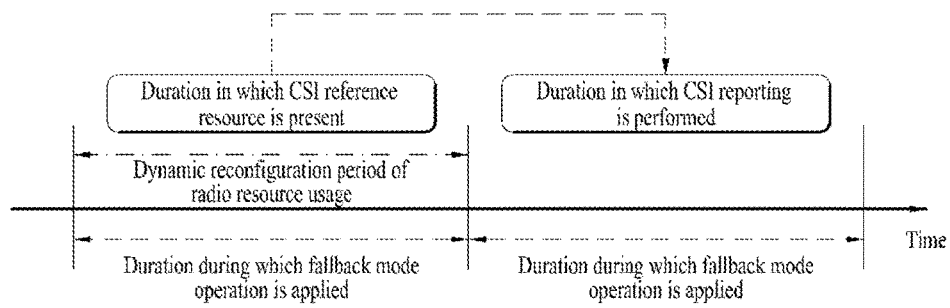
FIGS. 10A to 10C are diagrams referred to in explaining an ambiguity problem of a CSI reporting timing of a specific UE (eIMTA UE) and/or a timing/location of a valid reference resource (e.g., CSI reference resource) linked with corresponding CSI reporting.
Figure 10B:
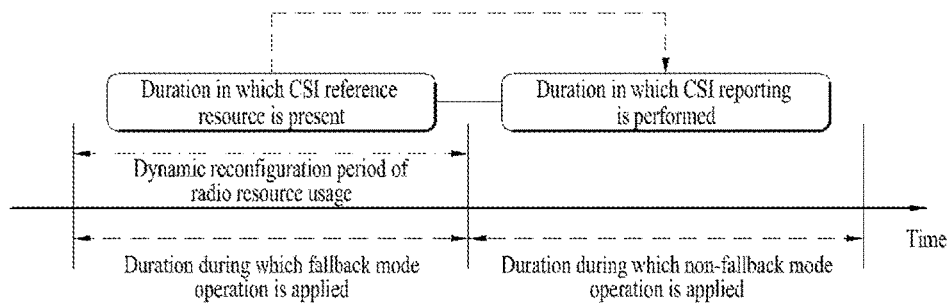
Figure 10C:
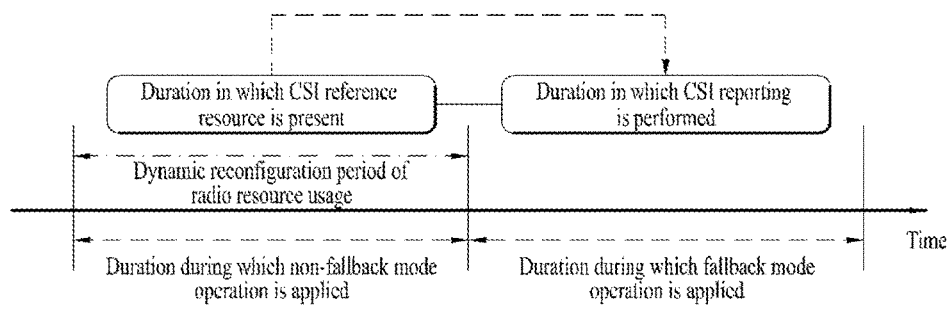

FIGS. 10A to 10C are diagrams referred to in explaining a mode duration (e.g., a fallback mode duration or a non-fallback mode duration) to which a CSI reporting timing of a specific UE (eIMTA UE) and/or a timing/location of a valid reference resource (e.g., CSI reference resource) linked with corresponding CSI reporting (e.g., a rule for determining the timing/location of the valid reference resource linked with CSI reporting of a specific timing is defined in TS 36.213) belongs.

In FIG. 10A, CSI reporting of a specific timing is performed in a duration during which a fallback mode operation is applied and a timing/location of a valid reference resource of corresponding CSI reporting is present in the duration during which the fallback mode operation is applied. In FIG. 10B, CSI reporting of a specific timing is performed in a duration during which a non-fallback mode operation is applied and the timing/location of the valid reference resource of corresponding CSI reporting is present in a duration during which the fallback mode operation is applied. In FIG. 10C, CSI reporting of a specific timing is performed in a duration during which the fallback mode operation is applied and the timing/location of the valid reference resource of corresponding CSI reporting is present in a duration during which the non-fallback mode operation is applied. It is assumed in FIGS. 10A to 10C that a duration during which the fallback mode is applied or a duration during which the non-fallback mode is applied is determined based on a dynamic reconfiguration period of radio resource usage.

The following embodiments may be configured to be limitedly applied only to some cases of FIGS. 10A to 10C or may be configured to be applied to all cases of FIGS. 10A to 10C. Additionally, the following embodiments may be extended to the case in which CSI reporting of a specific timing is performed in a duration during which the non-fallback mode operation is applied and the timing/location of the valid reference resource of corresponding CSI reporting is present in a duration during which the non-fallback mode operation is applied (e.g., the case in which UL-DL configuration (re)designated by the reconfiguration message is the same as SIB1 based UL-DL configuration).

Embodiment 4-1

According to Embodiment 4-1 of the present invention, in at least one (i.e., some or all) of the cases of FIGS. 10A to 10C, the UE (eIMTA UE) may be configured (as an exceptional case) to omit at least one of an operation of reporting at least one of a CQI, a PMI, a precoding type indicator (PTI), and a rank indication (RI) of a predefined specific value and an operation of reporting CQI information, PMI information, PTI information, and RI information.

For example, the CQI information (e.g., wideband CQI or subband CQI) may report (as an exceptional case) "out-of-range (OOR) value" (i.e., a value corresponding to CQI index #0) and, thus, the eNB may discern/derive a fallback mode operation by the UE.

As another example, at least one of the RI information and joint-encoded PTI information may be configured (as an exceptional case) to report a predefined value (e.g., 1) or to report again at least one of the latest RI value and PTI information. As an example of the latter case, the UE may be configured to report again at least one of the latest calculated/reported RI value (and/or PTI information) based on a valid reference resource located in a non-fallback mode duration and the latest reported RI value (and/or PTI information) in the non-fallback mode duration. The above-described methods enable reporting of incorrect or invalid RI information, thereby preventing (re)occurrence of an error in the CQI information, PMI information, or PTI information calculated based on the RI information.

As still another example, at least one of the CQI information, PMI information, PTI information, and RI information of a specific value reported based on this embodiment may be configured to be transmitted through (as an exceptional case) a predefined or signaled resource (e.g., PUCCH/PUSCH resource).

As another example, in FIGS. 10A to 10C, the UE may omit (as an exceptional case) reporting of information other than (particularly, P-CSI or A-CSI related) RI information, CQI information, PMI information, and PTI information having a specific value according to a predefined rule/configuration.

As another example, in FIGS. 10A to 10C, (8-TX antenna) PTI information may be reported/configured (as an exceptional case) with a predefined value (e.g., 'PTI=0' or 'PTI=1') and an attribute of at least one of (future reported) W1, W2, and CQI may be determined based on the PTI information. Generally, if the PTI information is set to 0, wideband W1 and wideband W2/CQI are reported and, if the PTI information is set to 1, wideband W2 and subband W2/CQI/L-bit subband indicator are reported.

As another example, in FIGS. 10A to 10C, reporting (i.e., subband attribute based reporting) other than wideband attribute based reporting among reporting related to CQI/PMI information may be configured (as an exceptional case) to be omitted, reporting (i.e., wideband attribute based reporting) other than subband attribute based reporting may be configured to be omitted, or reporting based on all attributes (i.e., wideband/subband attribute based reporting) may be configured to be omitted.

As another example, according to this embodiment, the same rule may be applied even to the case in which a valid reference resource for specific CSI reporting of (a specific timing) is not present in a preconfigured or signaled duration (window of the valid CSI reference resource) (i.e., when the valid reference resource is out of a lower bound of a predetermined duration).

Embodiment 4-2

According to Embodiment 4-2 of the present invention, Embodiment 4-1 may be limitedly applied only to a method of performing the above-described separate CSI measurement operation, interference estimation operation, or interference averaging operation, for interference having different characteristics, according to a predefined rule or signaled information. That is, in Table 7, Embodiment 4-1 may be limited applied only to a CSI reporting operation (e.g., P-CSI reporting operation and/or A-CSI reporting operation) related to a specific CSI measurement subframe set or a specific CSI measurement subframe set index.

For example, a CSI measurement subframe set to which Embodiment 4-1 is applied may be defined (implicitly or based on signaling) as a CSI measurement subframe set linked with a subframe set in which interference of a relatively variant characteristic is received from a neighbor cell (or a subframe set in which a serving cell performs change usage) or may be defined as a specific predefined or signaled (fixed) CSI measurement subframe set. Alternatively, the CSI measurement subframe set index to which Embodiment 4-1 is applied may be defined (implicitly or based on signaling) as a CSI measurement subframe set index (i.e., CSI measurement subframe set index #1 or $C_{CSI,1}$) linked with a subframe set in which interference of a relatively variant characteristic is received from a neighbor cell (or a subframe set in which a serving cell performs change usage) or may be defined as a specific predefined or signaled (fixed) CSI measurement subframe set index (i.e., CSI measurement subframe set index #1 or $C_{CSI,1}$).

As another example, the CSI measurement subframe set to which Embodiment 4-1 is applied may be defined (implicitly or based on signaling) as a CSI measurement subframe set linked with a subframe set in which interference of a relatively static (or fixed) characteristic is received from a neighbor cell (or a subframe set that a serving cell uses for static (or fixed) usage) or may be defined as a specific predefined (or signaled) (fixed) CSI measurement subframe set. Alternatively, the CSI measurement subframe set index to which Embodiment 4-1 is applied may be defined (implicitly or based on signaling) as a CSI measurement subframe set index (i.e., CSI measurement subframe set index #0 (i.e., $C_{CSI,0}$)) linked with a subframe set in which interference of a relatively static (or fixed) characteristic is received from a neighbor cell (or a subframe set that a serving cell uses for static (or fixed) usage) or may be defined as a specific predefined (or signaled) (fixed) CSI measurement subframe set index (i.e., CSI measurement subframe set index #0 or $C_{CSI,0}$).

Additionally, the CSI measurement subframe set or the CSI measurement subframe set index to which Embodiment 4-1 is applied may be defined (implicitly or based on signaling) as all CSI measurement subframe sets or CSI measurement subframe set indexes (i.e., CSI measurement subframe set index #0 ($C_{CSI,0}$) and CSI measurement subframe set index #1 ($C_{CSI,1}$)).

Embodiment 4-3

According to Embodiment 4-3, Embodiment 4-1 may be limitedly applied only to a method of performing the above-described separate CSI measurement operation, interference estimation operation, or interference averaging operation, for interference having different characteristics, according to a predefined rule (or signaled information). That is, Embodiment 4-1 may be configured to be limited applied only to a specific CSI process index related CSI reporting operation (e.g., P-CSI reporting operation and/or A-CSI reporting operation) in Table 8.

For example, a CSI process index to which Embodiment 4-1 is applied may be defined (implicitly or based on signaling) as a CSI process index which is used or configured to perform the separate CSI measurement operation, interference estimation operation or interference averaging operation, in a subframe set in which interference of a relatively variant characteristic is received from a neighbor cell (or a subframe set in which a serving cell performs usage change) or may be defined as a specific predefined (or signaled) (fixed) CSI process index.

As an example in which Embodiment 4-1 is applied to a specific predefined (fixed) CSI process index, Embodiment 4-1 may be limitedly applied only to CSI processes (e.g., from CSI process index #(P+1) to CSI process index #(2*P)) which pair with one of P CSI processes (i.e., one CSI process is not paired with a plurality of CSI processes and one CSI process is mapped to one CSI process without overlap) and use some information (e.g., non-zero power CSI-RS resource configuration information), other than P CSI processes (e.g., from CSI process index #1 to CSI process index #P) in which a combination of one specific non-zero power CSI-RS resource and one CSI-IM resource is configured in the same manner as legacy Rel-11 CSI processes among 2*P CSI processes (i.e., 'N=2').

As another example, a CSI process index to which Embodiment 4-1 is applied may be defined as a CSI process index (implicitly or based on signaling) which is configured to perform the separate CSI measurement operation, interference estimation operation, or interference averaging operation, in a subframe set in which interference of a relatively static (or fixed) characteristic is received from a neighbor cell (or a subframe set used for static usage (or fixed usage) by a serving cell) or may be defined as a specific predefined (or signaled) (fixed) CSI process index.

That is, as an example in which Embodiment 4-1 is applied to a specific predefined (fixed) CSI process index, Embodiment 4-1 may be limitedly applied to P CSI processes (e.g., CSI process index #1 to CSI process index #P) in which a combination of one specific non-zero power CSI-RS resource and one CSI-IM resource is configured in the same manner as legacy Rel-11 CSI processes among 2*P CSI processes (i.e., the case in which 'N=2'). That is, Embodiment 4-1 may be configured not to be applied to the other CSI processes (e.g., from CSI process index #(P+1) to CSI process index #(2*P)) which pair with one of the P CSI processes (i.e., one CSI process is not paired with a plurality of CSI processes and one CSI process is mapped to one CSI process without overlap) according to a predefined rule (or signaling information) and use some information (e.g., non-zero power CSI-RS resource configuration information).

Additionally, the CSI process index to which Embodiment 4-1 is applied may be defined as all CSI process indexes (e.g., from CSI process index #1 to CSI process index #(2*P) when 'N=2') or may be defined as a total number of CSI processes configured for the UE by the eNB) (implicitly or based on signaling).

Embodiment 4-4

According to Embodiment 4-4 of the present invention, a lower bound of a window in which valid CSI reference resource(s) related to CSI reporting of a specific timing (i.e., SF #N) can be present may be configured to be a timing at which a (predefined) PDCCH is transmitted, a timing which includes the (predefined) PDCCH transmission timing and is located after the (predefined) PDCCH transmission timing, or a timing which does not include the (predefined) PDCCH transmission timing and is located after the (predefined) PDCCH transmission timing.

For example, the (predefined) PDCCH transmission timing may be defined as a subframe in which a reconfiguration message (refer to Table 9) is transmitted or may be defined as a start point of a window in which the same reconfiguration message (and in which a CSI reporting timing (i.e., SF #N) is included) (in terms of the UE performing CSI reporting of a specific timing (i.e., SF #N)) is transmitted. When the above methods/rules are applied, reporting of outdated CSI information caused by selecting the location (and/or timing) of a valid CSI reference resource location related to CSI reporting of a specific timing (i.e., SF #N) as a very old timing can be prevented. For example, a subframe in which the reconfiguration ($10 \cdot n_f$–n–k) mod T=0, message is transmitted may be defined as "subframes satisfying ($10 \cdot n_f$+n–k)mod T=0" as in Table 9 and a window in which the same reconfiguration message is transmitted may be defined as "radio frames or {m·T/10, m·T/10+1, . . . , (m+1)·T/10–1} or {(m+1)·T/10, (m+1)·T/10+1, . . . , (m+2) ·T/10–1}", as in Table 9.

TABLE 9

Details of signaling for TDD UL-DL reconfiguration

The UE is configured to monitor the reconfiguration DCI in subframes satisfying
$(10 \cdot n_f + n - k) \bmod T = 0$, where n is the subframe number within a radio frame, $n_f$ is
the radio frame number, T and k are defined in the following table.
The UL-DL configuration indicated by the reconfiguration DCI received in a subframe in
radio frame(s) $\{m \cdot T/10, m \cdot T/10 + 1, \ldots, (m + 1) \cdot T/10 - 1\}$ is valid for either
$\{m \cdot T/10, m \cdot T/10 + 1, \ldots, (m + 1) \cdot T/10 - 1\}$ (denoted as "Current") or
$\{(m + 1) \cdot T/10, (m + 1) \cdot T/10 + 1, \ldots, (m + 2) \cdot T/10 - 1\}$ (denoted as "Next"), as indicated by the
following table.
UE is not required to wake-up to monitor explicit reconfiguration DCI in DRX OFF.
FFS whether to specify the following two UE behaviours:
Behaviour 1: If a UE is configured to monitor in multiple subframes
reconfiguration DCIs for radio frames $\{m \cdot T/10, m \cdot T/10 + 1, \ldots, (m + 1) \cdot T/10 - 1\}$, the UE
may skip decoding the reconfiguration DCI for radio frames
$\{m \cdot T/10, m \cdot T/10 + 1, \ldots, (m + 1) \cdot T/10 - 1\}$ if the UE has successfully decoded at least one
reconfiguration DCI for radio frames $\{m \cdot T/10, m \cdot T/10 + 1, \ldots, (m + 1) \cdot T/10 - 1\}$.
Behaviour 2: If a UE is configured to monitor in multiple subframes
reconfiguration DCIs for radio frames $\{m \cdot T/10, m \cdot T/10 + 1, \ldots, (m + 1) \cdot T/10 - 1\}$, the UE
shall or may assume the same UL-DL configuration indicated by thereconfiguration
DCIs for radio frames $\{m \cdot T/10, m \cdot T/10 + 1, \ldots, (m + 1) \cdot T/10 - 1\}$.

| Periodicity T (ms) | Offset k (ms) ($0 \leq k < T$) | | Valid duration |
|---|---|---|---|
| 10 | A X-bit bitmap to indicate a set of SIB-1 DL/S subframe. Starting from the MSB to LSB, the bitmap corresponds to subframe #{[Xa, Xb, Xc, . . .]}. The bit "1" indicates that UE shall monitor the reconfiguration DCI in the corresponding subframe, and the bit "0" indicates otherwise. | | "Current" for the reconfiguration DCI in subframe #0 "Next" for the reconfiguration DCI in the SIB1 DL/S subframes other than subframe #0 |
| 20 | A Y-bit bitmap to indicate a set of SIB-1 DL/S subframe. Starting from the MSB to LSB, the bitmap corresponds to subframe #{[Ya, Yb, Yc, . . .]}. The bit "1" indicates that UE shall monitor the reconfiguration DCI in the corresponding subframe, and the bit "0" indicates otherwise. | | ["Current" for the reconfiguration DCI in subframe #0 in the first radio frame in the window, if supported by the Y-bit bitmap] "Next" for the reconfiguration DCI in the SIB1 DL/S subframes other than subframe #0 in the first radio frame in the window |
| 40 | A Z-bit bitmap to indicate a set of SIB-1 DL/S subframe. Starting from the MSB to LSB, the bitmap corresponds to subframe #{[Za, Zb, Zc, . . .]}. The bit "1" indicates that UE shall monitor the reconfiguration DCI in the corresponding subframe, and the bit "0" indicates otherwise. | | ["Current" for the reconfiguration DCI in subframe #0 in the first radio frame in the window, if supported by the Z-bit bitmap] "Next" for the reconfiguration DCI in the SIB1 DL/S subframes other than subframe #0 in the first radio frame in the window |
| [80] | A Q-bit bitmap to indicate a set of SIB-1 DL/S subframe. Starting from the MSB to LSB, the bitmap corresponds to subframe #{[Qa, Qb, Qc, . . .]}. The bit "1" indicates that UE shall monitor the reconfiguration DCI in the corresponding subframe, and the bit "0" indicates otherwise. | | ["Current" for the reconfiguration DCI in subframe #0 in the first radio frame in the window, if supported by the Q-bit bitmap] "Next" for the reconfiguration DCI in the SIB1 DL/S subframes other than subframe #0 in the first radio frame in the window |

Confirm the working assumption that the periodicity of the reconfiguration
signals includes at least 10 ms, 20 ms, 40 ms
Check if the working assumption of 80 ms periodicity can be confirmed in
RAN1#76
For 10 ms periodicity, the value of X is at least 4 and subframes #{[Xa, Xb,
Xc, . . .]} includes at least subframes #{0, 1, 5, 6}
The exact value of X and subframes #{[Xa, Xb, Xc, . . .]} is to be agreed in
RAN1#76
For 20 ms periodicity, the value of Y is at least 4 and subframes #{[Ya, Yb,
Yc, . . .]} includes at least subframes #{0, 1, 5, 6} in the 2nd radio frame in the window
The exact value of Y and subframes #{[Ya, Yb, Yc, . . .]} is to be agreed in
RAN1#76

TABLE 9-continued

Details of signaling for TDD UL-DL reconfiguration

For 40 ms periodicity, the value of Z is at least 4 and subframes #{[Za, Zb, Zc, . . .]} includes at least subframes #{0, 1, 5, 6} in the 4th radio frame in the window
The exact value of Z and subframes #{ [Za, Zb, Zc, . . .]} is to be agreed in RAN1#76
For 80 ms periodicity, if confirmed in RAN1#76, the value of Q is at least 4 and subframes #{[Qa, Qb, Qc, . . .]} includes at least subframes #{0, 1, 5, 6} in the 8th radio frame in the window
The exact value of Q and subframes #{[Qa, Qb, Qc, . . .]} is to be agreed in RAN1#76, if 80 ms periodicity is confirmed
UE shall not be configured to monitor reconfiguration DCI in non-SIB-1 DL/S subframes
The size of DCI that carries reconfiguration bits is aligned to DCI format 1C.
If UE does not detect L1 signaling conveying a valid UL-DL configuration for a radio frame,
UE shall monitor the non-DRX DL subframes or special subframes for PDCCH or EPDCCH as indicated by SIB-1 configuration
80 ms periodicity for the reconfiguration signaling is supported.
The number of eIMTA-RNTI configured for a UE is 1.
The eIMTA-RNTI is UE-specifically configured via RRC
Different UEs may be configured different eIMTA-RNTIs
The set of subframes that UE monitors for the explicit reconfiguration DCI is UE-specifically configured via RRC
The mapping between a reconfiguration index and a cell is UE-specifically configured via RRC
The explicit reconfiguration DCI only carries information for explicit reconfiguration
The set of subframes that a UE is possibly configured to monitor the reconfiguration signaling are based on:
For 10 ms periodicity, the set of subframes are the DL subframes and special subframes per SIB1
For 20 ms periodicity, the set of subframes are the DL subframes and special subframes per SIB1 in the 2nd radio frame in the window
For 40 ms periodicity, the set of subframes are the DL subframes and special subframes per SIB1 in the 4th radio frame in the window
For 80 ms periodicity, the set of subframes are the DL subframes and special subframes per SIB1 in the 8th radio frame in the window
The following is to be captured in the specification:
If a UE is configured to monitor in multiple subframes reconfiguration DCIs for radio frames {m · T/10, m · T/10 + 1, . . . , (m + 1) · T/10 − 1}, the UE may assume the same UL-DL configuration indicated by the reconfiguration DCIs for radio frames {m · T/10, m · T/10 + 1, . . . , (m + 1) · T/10 − 1}.
The same UL-DL configuration here refers to any cell configured for the UE with eIMTA-enabled
UE is required to monitor all subframes to carry reconfiguration DCI(s) for radio frames {m · T/10, m · T/10 + 1, . . . , (m +1) · T/10 − 1}at least until one valid UL-DL configuration for radio frames {m · T/10, m · T/10 + 1, . . . , (m + 1) · T/10 − 1} is detected.

In addition, an upper bound of a window at which valid CSI reference resource(s) related to CSI reporting of a specific timing (i.e., SF #N) can be present may be set to SF #(N−4) (or a timing at which an A-CSI triggering message is received in the case of A-CSI reporting) through a predefined rule (or predefined signaling).

The present embodiment may be configured to be limitedly applied only to a specific CSI measurement subframe set or a specific CSI measurement subframe set index or to be applied to all CSI reporting operations. For example, the present embodiment may be configured to be limitedly applied to a subframe set in which interference of a relatively variant characteristic is received from a neighbor cell (or a subframe set in which the serving cell performs usage change), i.e., to a P-CSI reporting operation or a A-CSI reporting operation related to CSI measurement subframe set index #1 (i.e., $C_{CSI,1}$).

Embodiment 4-4 may be configured to be limitedly applied only to a fallback mode or both to the fallback mode and a non-fallback mode.

Figure 11:
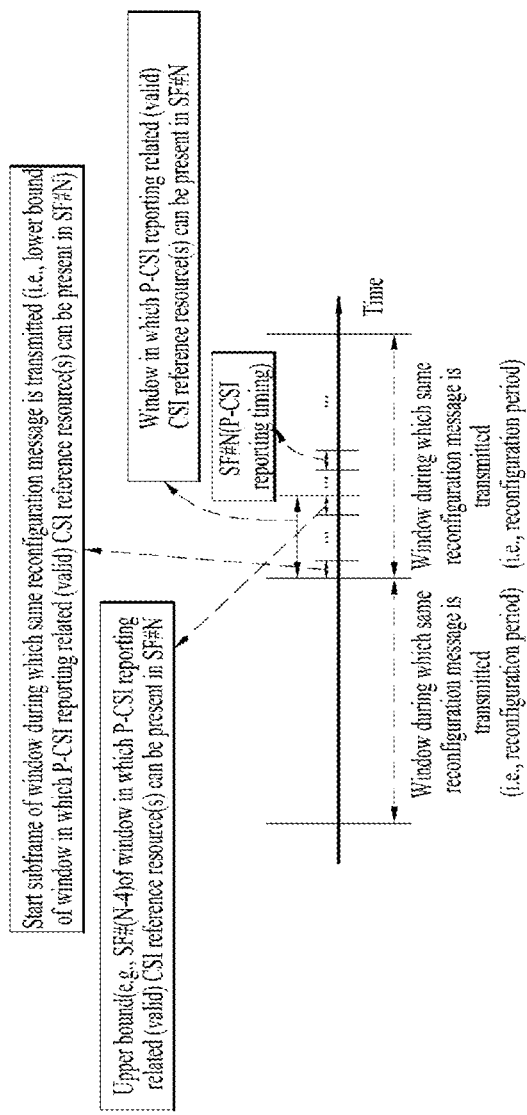
FIG. 11 is a diagram referred to in explaining one embodiment of the present invention.

FIG. 11 is a diagram referred to in explaining the case in which Embodiment 4-4 is applied. In FIG. 11, a lower bound of a window in which valid CSI reference resource(s) related to CSI reporting of a specific timing (i.e., SF #N) may be assumed as a start point of a window during which the CSI reporting timing (i.e., SF #N) is included and the same reconfiguration message is transmitted. An upper bound of a window in which CSI reporting related valid CSI reference resource(s) of a specific timing (i.e., SF #N) can be present may be assumed as SF # (N−4) through predefined configuration/rule/signaling.

Embodiment 4-5

At least one of Embodiment 4-1, Embodiment 4-3, and Embodiment 4-4 of the present invention may be configured to be limitedly applied only to a P-CSI reporting operation (or an A-CSI reporting operation) related to the specific CSI measurement subframe set or the specific CSI measurement subframe set index described in Embodiment 4-2 or may be configured to be applied to all of the CSI reporting operations.

At least one of Embodiment 4-1, Embodiment 4-2, and Embodiment 4-4 of the present invention may be configured to be limitedly applied only to the P-CSI reporting operation (or the A-CSI reporting operation) related to the specific CSI process index described in Embodiment 4-3 or may be configured to be applied to all of the CSI reporting operations.

Embodiment 4-6

At least one of Embodiment 4-1 to Embodiment 4-5 of the present invention may be configured to be limitedly applied only to a specific case of FIGS. 10A to 10C, may be configured to be limitedly applied only to a combination of some cases (e.g., a combination of FIG. 10A and FIG. 10B or a combination of FIG. 10A and FIG. 10C), or may be configured to be applied to all cases.

At least one of Embodiment 4-1 to Embodiment 4-5 of the present invention may be configured to be limitedly applied only to a specific TM (e.g., Embodiment 4-3 is limitedly applied only to TM 10 or Embodiment 4-2 is limitedly applied only to TM 9/TM 10 (or TM 1 to TM 10) or may be configured to be applied to all TMs.

Furthermore, the above-described embodiments may be configured to be limitedly applied only to the case in which a dynamic change (eIMTA) mode of radio resource usage is configured, the case in which a specific TM is configured, or the case in which specific UL-DL configuration is (re) configured.

It is apparent that examples/configurations/rules of the above-described embodiments may be regarded as proposed schemes for carrying out the present invention. In addition, although the above-described embodiments may be independently implemented, they may be implemented as a combination/aggregate of one or more embodiments.

Information about the embodiments/configurations/rules of the present invention or information as to whether the embodiments/configurations/rules of the present invention are applied may be signaled to the UE by the eNB through a predefined signal (e.g., physical layer or higher layer signal).

The above-described embodiments may be configured to be limitedly applied only to a predefined (or signaled) specific CSI feedback mode/type (e.g., a feedback mode/type performed through a PUSCH or a feedback mode/type performed through a PUCCH) or may be configured to be limitedly applied only to the case in which a PMI/RI reporting operation is configured or the PMI/RI reporting operation is disabled. Alternatively, the present invention may be applied regardless of whether the PMI/RI reporting operation is configured.

The above-described embodiments of the present invention may be configured to be limitedly applied only to at least one (i.e., some or all) of CQI information, PMI information, PTI information, and RI information reporting operations.

Figure 12:
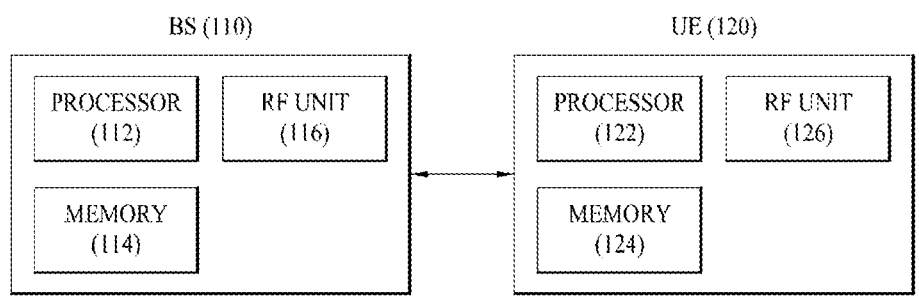
FIG. 12 illustrates a BS and a UE that are applicable to an embodiment of the present invention.

FIG. 12 illustrates a BS and a UE that are applicable to an embodiment of the present invention.

If a wireless communication system includes a relay, communication in a backhaul link is performed between the BS and the relay and communication in an access link is performed between the relay and the UE. Accordingly, the BS or the UE shown in FIG. 13 may be replaced with the relay according to situation.

Referring to FIG. 13, a wireless communication system includes a BS 110 and a UE 120. The BS 110 includes a processor 112, a memory 114, and a radio frequency (RF) unit 116. The processor 112 may be configured to perform the procedures and/or methods proposed in the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as being performed by the BS in this disclosure may be performed by an upper node of the BS in some cases. That is, it is apparent that, in a network comprised of a plurality of network nodes including the BS, various operations performed for communication with the UE can be performed by the BS or network nodes other than the BS. The term BS may be replaced with a fixed station, a Node B, an eNode B (eNB), an access point, etc.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit may be located at the interior or exterior of the processor and may transmit and receive data to and from the processor via various known means.

The memory unit may be located inside or outside the processor to exchange data with the processor by various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the above-described method of supporting a fall-back operation in a wireless communication system supporting usage change of a radio resource and the apparatus therefor have been described centering on an example applied to a 3GPP LTE system, the present invention is applicable to a variety of wireless communication systems in addition to the 3GPP LTE system.

What is claimed is:

1. A method performed by a user equipment (UE) in a wireless communication system, the method comprising:
receiving information for configuring a set of flexible resources;
receiving first configuration information for at least one channel state information (CSI) resource set;
receiving information for reconfiguring at least one flexible resource included in the set of flexible resources;
based on the at least one flexible resource reconfigured as at least one downlink resource, receiving, in the at least one flexible resource, a channel state information reference signal (CSI-RS) related to the first configuration information; and
transmitting the CSI related to the CSI-RS.

2. The method of claim 1, further comprising:
receiving second configuration information for transmission of a sounding reference signal (SRS) in the set of flexible resources; and
based on the at least one flexible resource reconfigured as at least one uplink resource, transmitting, in the at least one flexible resource, the SRS in response to the second configuration information,
wherein based on the at least one flexible resource reconfigured as at least one downlink resource, the transmission of the SRS is dropped in the at least one flexible resource.

3. The method of claim 1, wherein the at least one CSI resource set comprises CSI-reference signal (CSI-RS) resources comprising at least one of (i) non-zero power (NZP) CSI-RS resource or (ii) channel state information-interference measurement (CSI-IM) resource.

4. The method of claim 1, wherein a flexible resource denotes that a time resource which is available to be used as different usage from usage configured based on an uplink downlink configuration included in the information for configuring the set of flexible resources.

5. The method of claim 1, wherein the information for reconfiguring the at least one flexible resource is received through downlink control information.

6. An apparatus configured to operate in a wireless communication system, the apparatus comprising:
at least one processor;
at least one computer-readable memory storing instructions that, based on being executed by the at least one processor, perform operations comprising:
receiving information for configuring a set of flexible resources;
receiving first configuration information for at least one channel state information (CSI) resource set;
receiving information for reconfiguring at least one flexible resource included in the set of flexible resources;
based on the at least one flexible resource reconfigured as at least one downlink resource, receiving, in the at least one flexible resource, a channel state information reference signal (CSI-RS) related to the first configuration information; and
transmitting the CSI related to the CSI-RS.

7. The apparatus of claim 6, wherein the operations further comprise:
receiving second configuration information for transmission of a sounding reference signal (SRS) in the set of flexible resources; and
based on the at least one flexible resource reconfigured as at least one uplink resource, transmitting, in the at least one flexible resource, the SRS in response to the second configuration information,
wherein based on the at least one flexible resource reconfigured as at least one downlink resource, the transmission of the SRS is dropped in the at least one flexible resource.

8. The apparatus of claim 6, wherein the at least one CSI resource set comprises CSI-reference signal (CSI-RS) resources comprising at least one of (i) non-zero power (NZP) CSI-RS resource or (ii) channel state information-interference measurement (CSI-IM) resource.

9. The apparatus of claim 6, wherein a flexible resource denotes that a time resource which is available to be used as different usage from usage configured based on an uplink downlink configuration included in the information for configuring the set of flexible resources.

10. The apparatus of claim 6, wherein the information for reconfiguring the at least one flexible resource is received through downlink control information.

11. A method performed by a base station (BS) in a wireless communication system, the method comprising:
transmitting information for configuring a set of flexible resources;
transmitting first configuration information for at least one channel state information (CSI) resource set;
transmitting information for reconfiguring at least one flexible resource included in the set of flexible resources;
based on the at least one flexible resource reconfigured as at least one downlink resource, transmitting, in the at least one flexible resource, a channel state information reference signal (CSI-RS) related to the first configuration information; and
receiving the CSI in response to the CSI-RS.

12. The method of claim 11, further comprising:
transmitting first configuration information for reception of a sounding reference signal (SRS) in the set of flexible resources; and
based on the at least one flexible resource reconfigured as at least one uplink resource, receiving, in the at least one flexible resource, the SRS in response to the first configuration information,
wherein based on the at least one flexible resource reconfigured as at least one downlink resource, the SRS is not received in the at least one flexible resource.

13. The method of claim 11, wherein the at least one CSI resource set comprises CSI-reference signal (CSI-RS) resources comprising at least one of (i) non-zero power (NZP) CSI-RS resource or (ii) channel state information-interference measurement (CSI-IM) resource.

14. The method of claim 11, wherein a flexible resource denotes that a time resource which is available to be used as different usage from usage configured based on an uplink downlink configuration included in the information for configuring the set of flexible resources.

15. The method of claim 11, wherein the information for reconfiguring the at least one flexible resource is transmitted through downlink control information.

16. An apparatus configured to operate in a wireless communication system, the apparatus comprising:

at least one processor;

at least one computer-readable memory storing instructions that, based on being executed by the at least one processor, perform operations comprising:

transmitting information for configuring a set of flexible resources;

transmitting first configuration information for at least one channel state information (CSI) resource set;

transmitting information for reconfiguring at least one flexible resource included in the set of flexible resources;

based on the at least one flexible resource reconfigured as at least one downlink resource, transmitting, in the at least one flexible resource, a channel state information reference signal (CSI-RS) related to the first configuration information; and receiving the CSI in response to the CSI-RS.

17. The apparatus of claim 16, wherein the operations further comprise:

transmitting first configuration information for reception of a sounding reference signal (SRS) in the set of flexible resources; and based on the at least one flexible resource reconfigured as at least one uplink resource, receiving, in the at least one flexible resource, the SRS in response to the first configuration information, wherein based on the at least one flexible resource reconfigured as at least one downlink resource, the SRS is not received in the at least one flexible resource.

18. The apparatus of claim 16, wherein the at least one CSI resource set comprises CSI-reference signal (CSI-RS) resources comprising at least one of (i) non-zero power (NZP) CSI-RS resource or (ii) channel state information-interference measurement (CSI-IM) resource.

19. The apparatus of claim 16, wherein a flexible resource denotes that a time resource which is available to be used as different usage from usage configured based on an uplink downlink configuration included in the information for configuring the set of flexible resources.

20. The apparatus of claim 16, wherein the information for reconfiguring the at least one flexible resource is transmitted through downlink control information.

* * * * *